US011700894B2

(12) United States Patent
Furlong

(10) Patent No.: US 11,700,894 B2
(45) Date of Patent: *Jul. 18, 2023

(54) AMBIDEXTROUS FISH SCALE-TEXTURED GLOVE

(71) Applicant: Covco (H.K.) Limited, Wanchai (HK)

(72) Inventor: John Joseph Furlong, Bangkok (TH)

(73) Assignee: Covco (H.K.) Limited, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,850

(22) Filed: Oct. 28, 2021

(65) Prior Publication Data

US 2022/0047020 A1 Feb. 17, 2022

Related U.S. Application Data

(63) Continuation of application No. 15/833,649, filed on Dec. 6, 2017, now Pat. No. 11,241,051, which is a continuation of application No. 15/631,342, filed on Jun. 23, 2017, now abandoned, which is a continuation of application No. 14/325,578, filed on Jul. 8, 2014, now Pat. No. 9,730,477.

(51) Int. Cl.
*A41D 19/00* (2006.01)
*B29C 41/14* (2006.01)
*A41D 19/015* (2006.01)
*A41D 19/04* (2006.01)
*B29L 31/48* (2006.01)

(52) U.S. Cl.
CPC ... *A41D 19/0003* (2013.01); *A41D 19/01547* (2013.01); *A41D 19/04* (2013.01); *B29C 41/14* (2013.01); *A41D 19/0058* (2013.01); *B29L 2031/4864* (2013.01)

(58) Field of Classification Search
CPC ................... A41D 19/0003; A41D 19/01547
See application file for complete search history.

(56) References Cited

U.S. PATENT DOCUMENTS

| | | | |
|---|---|---|---|
| 1,206,102 | A | 11/1916 | Gibson |
| 3,411,982 | A | 11/1968 | Kavalir et al. |
| 3,600,716 | A | 8/1971 | Berry |
| 3,883,899 | A | 5/1975 | Ganz |
| 4,084,265 | A | 4/1978 | Anfelt |
| 4,329,312 | A | 5/1982 | Ganz |
| 4,441,213 | A | 4/1984 | Trumble et al. |
| 5,421,033 | A | 6/1995 | Deleo |
| 5,500,956 | A | 3/1996 | Schulkin et al. |

(Continued)

FOREIGN PATENT DOCUMENTS

| | | |
|---|---|---|
| CN | 1812730 A | 8/2006 |
| CN | 101098637 A | 1/2008 |

(Continued)

OTHER PUBLICATIONS

Blackley, "Latex-dipping processes," Polymer Latices, Chapter 17, 1997, pp. 155-228.

(Continued)

*Primary Examiner* — Tajash D Patel
(74) *Attorney, Agent, or Firm* — Fredrikson & Byron, P.A.

(57) ABSTRACT

The described invention relates to an ambidextrous working glove having fish scale-textured inner and outer surfaces and methods of making same.

26 Claims, 19 Drawing Sheets

(56) References Cited

U.S. PATENT DOCUMENTS

| | | |
|---|---|---|
| 5,676,092 A | 10/1997 | Ortolivo |
| 5,794,266 A | 8/1998 | Han |
| 6,081,928 A | 7/2000 | Bourne |
| 6,099,936 A | 8/2000 | Kashihara |
| 6,254,947 B1 | 7/2001 | Schaller |
| 6,451,893 B1 | 9/2002 | Tao |
| 6,790,933 B2 | 9/2004 | Huynh et al. |
| D519,684 S | 4/2006 | Simic |
| 7,234,170 B2 | 6/2007 | Simic |
| 7,356,852 B2 | 4/2008 | Thai |
| D602,207 S | 10/2009 | Hull |
| 7,691,436 B2 | 4/2010 | Neuser et al. |
| 7,718,240 B2 | 5/2010 | Neuser et al. |
| 7,802,314 B2 | 9/2010 | Cohen |
| 8,028,348 B2 | 10/2011 | Hull |
| 8,075,965 B2 | 12/2011 | Neuser et al. |
| 8,286,264 B2 | 10/2012 | Hull |
| 8,302,216 B2 | 11/2012 | Hull |
| 8,458,818 B2 | 6/2013 | Neuser et al. |
| 8,495,764 B2 | 7/2013 | Hull |
| 8,889,787 B2 | 11/2014 | Nagahama et al. |
| 8,980,373 B2 | 3/2015 | Nethsinghe et al. |
| D735,968 S | 8/2015 | Furlong |
| D745,999 S | 12/2015 | Sood |
| 9,730,477 B2 | 8/2017 | Furlong |
| 11,241,051 B2 * | 2/2022 | Furlong ............... A41D 19/04 |
| 2003/0118837 A1 | 6/2003 | Modha et al. |
| 2003/0124354 A1 | 7/2003 | Vistins |
| 2004/0036196 A1 | 2/2004 | Conley |
| 2005/0037054 A1 | 2/2005 | Hamann |
| 2005/0177923 A1 | 8/2005 | Simic |
| 2006/0041991 A1 | 3/2006 | Kim |
| 2006/0048270 A1 | 3/2006 | Chen |
| 2006/0115653 A1 | 6/2006 | Soerens et al. |
| 2006/0140994 A1 | 6/2006 | Bagwell et al. |
| 2009/0007313 A1 | 1/2009 | Boorsma et al. |
| 2009/0139011 A1 | 6/2009 | Vanermen et al. |
| 2010/0017940 A1 | 1/2010 | Sha et al. |
| 2011/0191936 A1 | 8/2011 | Lipinski et al. |
| 2012/0000005 A1 | 1/2012 | Kishihara et al. |
| 2012/0005807 A1 | 1/2012 | Hull |
| 2012/0036612 A1 | 2/2012 | Hull |
| 2013/0091618 A1 | 4/2013 | Tanaka et al. |
| 2013/0219588 A1 | 8/2013 | Nakagawa |
| 2013/0305430 A1 | 11/2013 | Tomono |
| 2014/0041096 A1 | 2/2014 | Takahashi |
| 2014/0115751 A1 | 5/2014 | Saito et al. |
| 2015/0143609 A1 | 5/2015 | Francisco Costa et al. |
| 2015/0164160 A1 | 6/2015 | Furlong |
| 2015/0257464 A1 | 9/2015 | Furlong |
| 2015/0272241 A1 | 10/2015 | Lucas et al. |
| 2016/0183611 A1 | 6/2016 | Dangalla et al. |
| 2016/0192721 A1 | 7/2016 | Kishihara |

FOREIGN PATENT DOCUMENTS

| | | |
|---|---|---|
| CN | 102131475 A | 7/2011 |
| EP | 824896 A1 | 2/1998 |
| EP | 1260549 A1 | 11/2002 |
| EP | 1435374 A2 | 7/2004 |
| EP | 925329 B1 | 3/2005 |
| EP | 1965719 A2 | 9/2008 |
| EP | 1638423 B1 | 9/2011 |
| EP | 2381100 A2 | 10/2011 |
| GB | 2100580 A | 1/1983 |
| JP | H05186902 A | 7/1993 |
| JP | 2005514228 A | 5/2005 |
| JP | 2012523505 A | 10/2012 |
| KR | 1020120041281 A | 5/2012 |
| WO | 9748765 A1 | 12/1997 |
| WO | 93057444 A1 | 7/2003 |
| WO | 2005002375 A1 | 1/2005 |
| WO | 2005110749 A1 | 11/2005 |
| WO | 2007058880 A2 | 5/2007 |
| WO | 2007105122 A1 | 9/2007 |
| WO | 2010023634 A2 | 3/2010 |
| WO | 2010088713 A1 | 8/2010 |

OTHER PUBLICATIONS

Australian Examination Report received in related AU 356099 dated Nov. 3, 2014.

Combined Search and Examination Report under Sections 17 and 18(3) received in related GB1415814.1 dated Oct. 1, 2014.

EP Pat. App. No. 13899233.4, Extended European Search Report dated Jul. 20, 2017, 7 pages.

International Patent Application No. PCT/US2013/074919, International Search Report and Written Opinion dated Aug. 27, 2015, 9 pages.

* cited by examiner

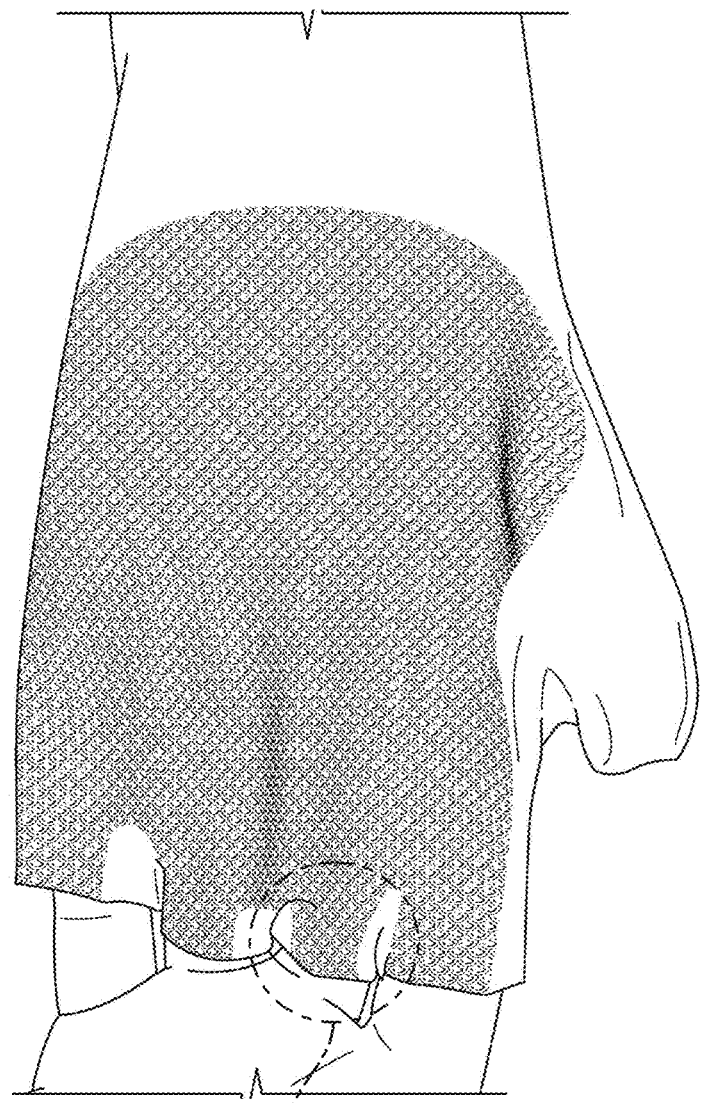

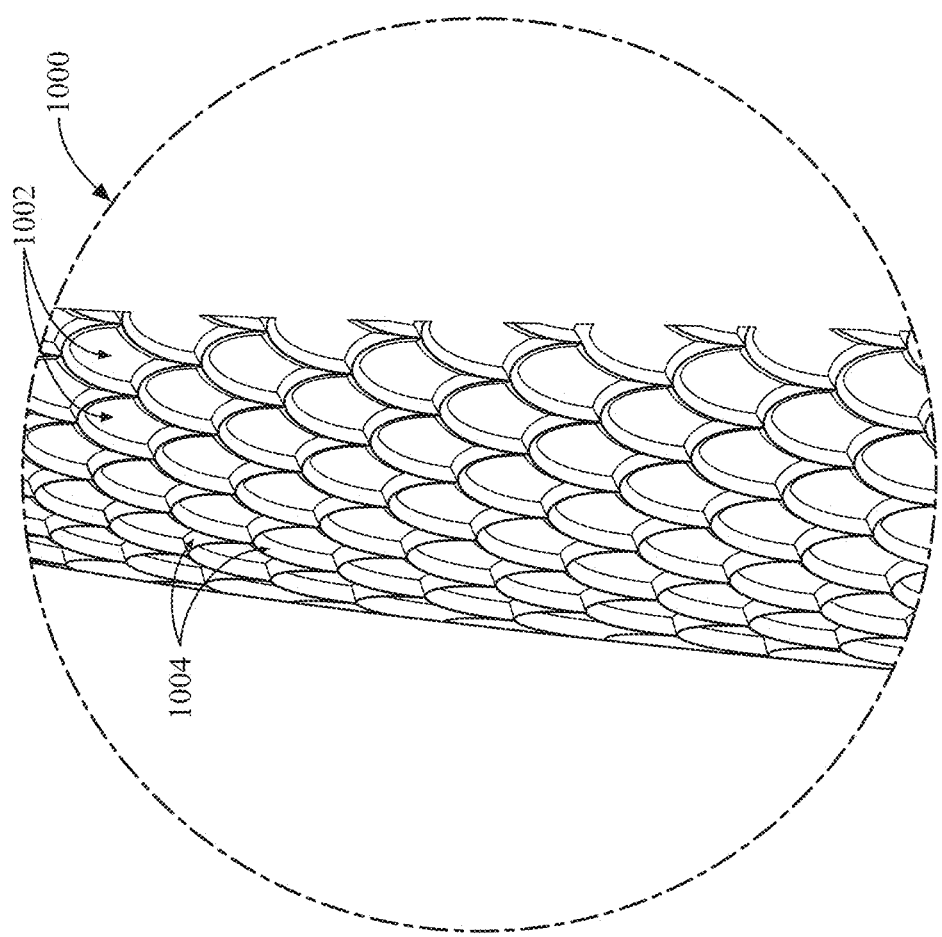

AMBIDEXTROUS FISH SCALE-TEXTURED GLOVE

This application is a continuation of commonly owned, co-pending U.S. patent application Ser. No. 15/833,649, titled "AMBIDEXTROUS FISH SCALE-TEXTURED GLOVE," having a filing date of Dec. 6, 2017, which is a continuation of commonly owned, U.S. patent application Ser. No. 15/631,342, titled "AMBIDEXTROUS FISH SCALE-TEXTURED GLOVE," having a filing date of Jun. 23, 2017, which is a continuation of commonly owned, U.S. patent application Ser. No. 14/325,578, titled "AMBIDEXTROUS FISH SCALE-TEXTURED GLOVE," having a filing date of Jul. 8, 2014, and which matured into U.S. Pat. No. 9,730,477, having an issue date of Aug. 15, 2017, the contents of each of which are incorporated by reference herein in their entirety.

FIELD OF THE INVENTION

The described invention relates to an ambidextrous working glove having fish scale-textured inner and outer surfaces and methods of making same.

BACKGROUND

Typical uses of working gloves include food processing, chemical handling, pesticide spraying, and the like. The thickness of working gloves should not hamper tactile sensation. However, the working gloves should be strong enough to resist rupture. It is desirable in working gloves to provide roughened or textured inner and outer surfaces, since working gloves with smooth surfaces make gripping items difficult for a wearer. A textured outer surface enables a wearer to adequately grip items that may be slippery. In addition, the inner surface of the glove is in close contact with the wearer's skin and does not absorb the wearer's perspiration. A textured inner surface may reduce the likelihood of slippage of the wearer's hand inside the working glove during use that may be caused by perspiration, wherein the textured inner surface may enable the perspiration to flow away from any pressured surface without "skating" of the glove over the surface of the wearer's hand.

Current attempts to form a glove with textured inner and outer surfaces have employed methods whereby a texture is imparted to the inner surface by using a textured form, and either treating the film forming the glove in a manner that erodes the film thereby creating texture on the outer surface, or by spraying particles onto the outer surface of the glove. Such methods are unsatisfactory, due to various factors, such as, for example, lack of dexterity, difficulty in donning, non-uniform thickness of the glove causing the glove to rupture during use.

Current working gloves frequently utilize donning powders, such as, for example, cornstarch or talc, to enable a wearer to don the glove more easily. However, donning powders can contaminate wounds, irritate skin, leave a residue on equipment and clothing, and mechanically interfere with some procedures that a user may perform while wearing the working glove.

Previous attempts to ameliorate the slippage of the glove caused by the wearer's perspiration have proved unsuccessful. For example, cotton flock linings frequently are only able to absorb small amount of perspiration before losing their effectiveness.

Additionally, present methods to impart a contact-reducing texture to the inner surface of the glove to ameliorate the effects of the wearer's perspiration and/or aid donning frequently reduce mechanical performance of the glove, leading to rupture of the glove.

Accordingly, there remains a need for a working glove with textured inner and outer surfaces, with improved dexterity, ease of donning and a reduced frequency of failure during use.

SUMMARY

The present invention provides an ambidextrous working glove having fish scale-textured inner and outer surfaces and methods of making same.

In one embodiment, the present invention provides a method for making an ambidextrous working glove having fish scale-textured inner and outer surfaces comprising the steps of:
a. providing a first polymer solution;
b. providing a coagulant solution;
c. providing a second polymer solution;
d. providing at least one former having a fish scale-textured surface and dipping the at least one former into the coagulant solution to coat the at least one former with coagulant;
e. removing the at least one former from the coagulant solution and drying the coagulant coating on the at least one former;
f. dipping the at least one former coated with coagulant into the first polymer solution, and allowing the first polymer solution to coat the at least one former;
g. removing the at least one former from the first polymer solution and drying the polymer coating on the at least one former, forming a film;
h. washing the film on the at least one former, and dipping the film coated at least one former into a second polymer solution, and allowing the second polymer solution to coat the film; and
i. stripping the glove from the at least one former.

In one embodiment, the ambidextrous working glove of the present invention complies with at least one requirement selected from the group consisting of FFDCA requirements for food handling, European Standard EN374-3, European Standard EN388:2003, European Standard EN374-2, European Standard EN420:2003, European Standard EN1186:2002, and European Standard EN421:2010.

In one embodiment, the ambidextrous working glove of the present invention complies with FFDCA requirements for food handling.

In one embodiment, the ambidextrous working glove of the present invention complies with European Standard EN374-3.

In one embodiment, the ambidextrous working glove of the present invention complies with European Standard EN388:2003.

In one embodiment, the ambidextrous working glove of the present invention complies with European Standard EN374-2.

In one embodiment, the ambidextrous working glove of the present invention complies with European Standard EN420:2003.

In one embodiment, the ambidextrous working glove of the present invention complies with European Standard EN1186:2002.

In one embodiment, the ambidextrous working glove of the present invention complies with European Standard EN421:2010.

In one embodiment, the at least one former has a fish scale-textured surface that imparts a fish scale-texture to the ambidextrous working glove of the present invention. In one embodiment, the fish scale-textured surface of the at least one former imparts a fish scale-texture to the inner and outer surfaces of the ambidextrous working glove of the present invention.

In one embodiment, first polymer solution is a synthetic rubber copolymer solution. The synthetic rubber copolymer solution may be a solution comprising a copolymer of acetonitrile and butadiene.

In one embodiment, first polymer solution is a latex solution.

In one embodiment, second polymer solution is a solution that allows the ambidextrous working glove of the present invention to slide over a wearer's hand while the glove is being donned.

In one embodiment, the second polymer solution is a polyurethane solution.

In one embodiment, the present invention provides an ambidextrous working glove having fish scale-textured inner and outer surfaces.

In one embodiment, the present invention provides at least one former for making an ambidextrous an ambidextrous working glove having fish scale-textured inner and outer surfaces wherein:
  a. the surface of the at least one former is textured on the front and back of the region of the at least one former that forms the fingers of the ambidextrous working glove;
  b. the surface of the at least one former is textured on the region of the at least one former that forms the palm of the ambidextrous working glove;
  c. the surface of the at least one former is textured on the region of the at least one former that forms the back of the ambidextrous working glove; and
  d. the surface of the at least one former is textured on the region of the at least one former that forms the region of the thumb that faces the palm of the ambidextrous working glove.

BRIEF DESCRIPTION OF THE DRAWINGS

FIG. 11 shows the inner surface of one embodiment of the ambidextrous working glove of the present invention.

FIG. 17 shows an enlarged portion of the thumb region of the ambidextrous working glove of FIG. 10A.

DETAILED DESCRIPTION

In one embodiment, the ambidextrous working glove of the present invention is formed on at least one former, which may be suitably mounted on a desired carrier, such as a movable board or a conveyor chain. The at least one former is carried sequentially through a series of steps as illustrated schematically in FIG. 1. In forming the ambidextrous working glove of the present invention, it is preferable to dip the at least one former into a bath of suitable coagulant material. The coagulant may control the thickness of the film of the first polymer solution that forms on the at least one former, that forms the ambidextrous working glove of the present invention. Alternatively, the coagulant may assist in the later removal of the ambidextrous working glove of the present invention from the at least one former. Alternatively, the coagulant solution may control the thickness of the film of the first polymer solution and may assist in the later removal of the ambidextrous working glove of the present invention from the at least one former. The at least one former is dipped into a slip dip bath of a first polymer solution to form a film on the at least one former. The film coated at least one former is passed through an oven to solidify the film. The solid film coated at least one former is then washed or leached to remove any contaminants, then the washed solid film coated at least one former is then dipped into a second polymer solution that coats the solid film coated at least one former. A bead is formed on the coated film on the at least one former, and the finished glove is then stripped from the at least one former.

In certain embodiments, the coated film may be treated before the finished glove is stripped from the at least one former. The treatment may be vulcanization. Alternatively, the coated film may be treated with at least one additional chemical. Examples of the at least one additional chemical may include antimicrobial agents, such as the antimicrobial coating disclosed in EP 1965719 A2.

Figure 1:
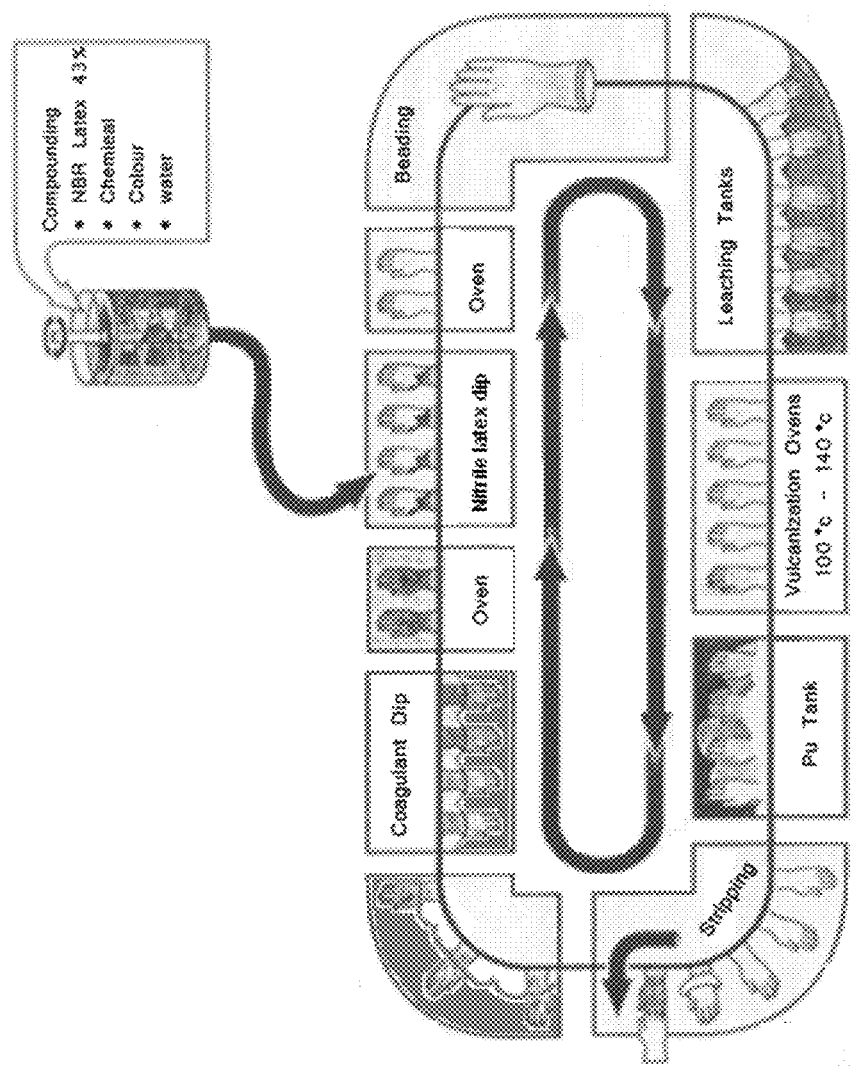
FIG. 1 depicts one method by which one embodiment of the ambidextrous working glove of the present invention may be formed.
Figure 2:
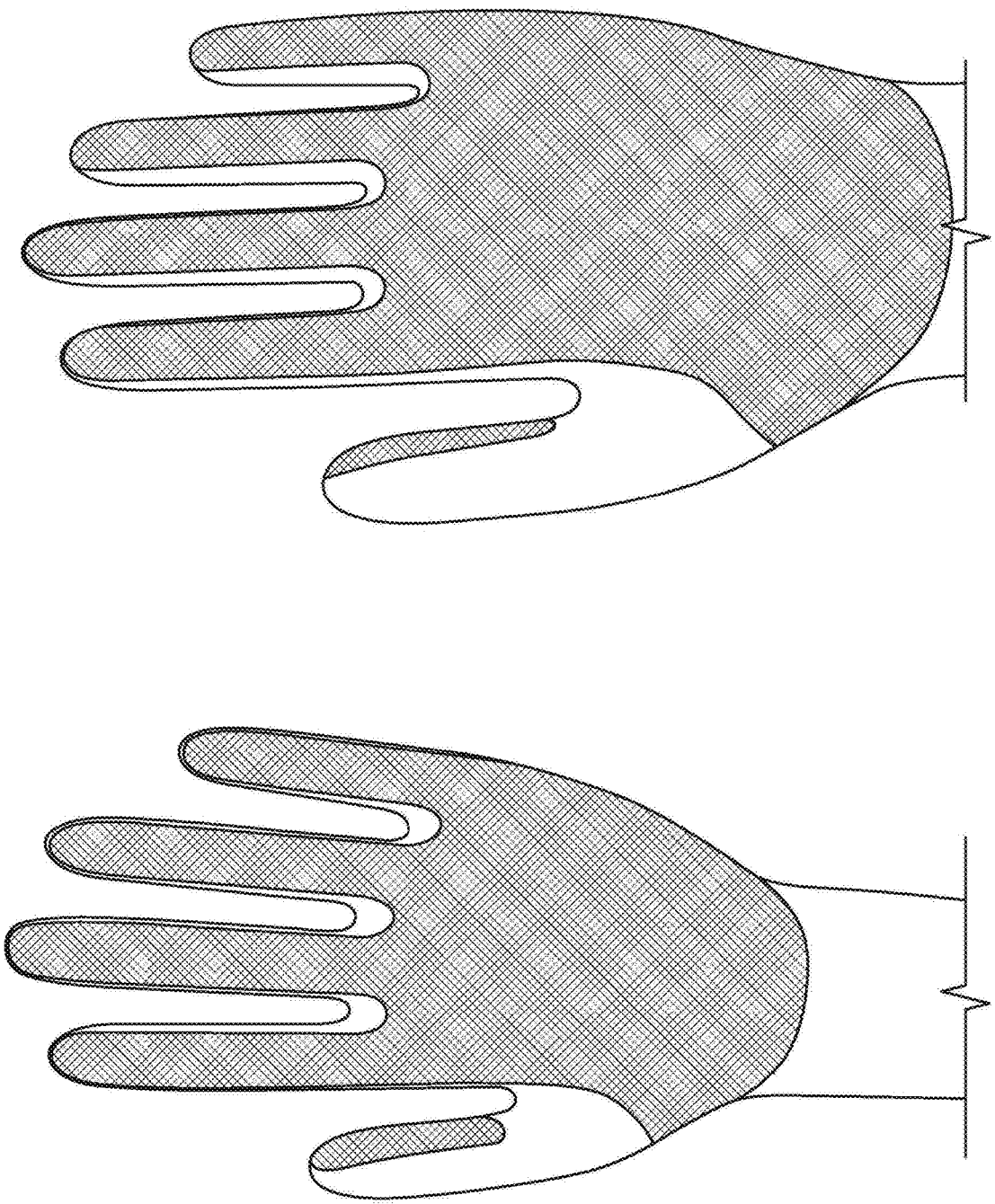
FIGS. 2a and 2b show an at least one former that is utilized to form one embodiment of the ambidextrous working glove of the present invention.

Referring to FIG. 1, an ambidextrous working glove having fish scale-textured inner and outer surfaces is made via a method comprising the steps of:
a. providing a first polymer solution;
b. providing a coagulant solution;
c. providing a second polymer solution;
d. providing at least one former having a fish scale-textured surface and dipping the at least one former into the coagulant solution to coat the at least one former with coagulant;
e. removing the at least one former from the coagulant solution and drying the coagulant coating on the at least one former;
f. dipping the at least one former coated with coagulant into the first polymer solution, and allowing the first polymer solution to coat the at least one former;
g. removing the at least one former from the first polymer solution and drying the polymer coating on the at least one former, forming a film;
h. washing the film on the at least one former, and dipping the film coated at least one former into a second polymer solution, and allowing the second polymer solution to coat the film; and
i. stripping the glove from the at least one former.

In one embodiment, the finished gloves may then be further processed. Such further processing may include, for example, packaging, sterilization, and the like.

In one embodiment, prior to removal of the finished glove from the at least one former, the finished glove may be treated with at least one additional chemical. Examples of the at least one additional chemical may include antimicrobial agents, such as the antimicrobial coating disclosed in EP 1965719 A2. The inner surface of the finished glove may be treated with at least one additional chemical. Alternatively, the outer surface of the finished glove may be treated with at least one additional chemical. Alternatively, both the inner and outer surface of the finished glove may be treated with at least one additional chemical.

The first polymer solution may be any polymer suitable for forming a working glove that complies with at least one requirement selected from the group consisting of FFDCA requirements for food handling, European Standard EN374-3, European Standard EN388:2003, European Standard EN374-2, European Standard EN420:2003, European Standard EN1186:2002, and European Standard EN421:2010.

The first polymer solution may be any polymer suitable for forming a working glove that complies with European Standard EN374-3 for chemical resistance. Alternatively, the first polymer solution may be any polymer suitable for forming a working glove that complies with FFDCA requirements for food handling. Alternatively, the first polymer solution may be any polymer suitable for forming a working glove that complies with European Standard EN388:2003 for protective gloves against mechanical risks. Alternatively, the first polymer solution may be any polymer suitable for forming a working glove that complies with European Standard EN374-2. Alternatively, the first polymer solution may be any polymer suitable for forming a working glove that complies with European Standard EN420:2003. Alternatively, the first polymer solution may be any polymer suitable for forming a working glove that complies with.

European Standard EN1186:2002. Alternatively, the first polymer solution may be any polymer suitable for forming a working glove that complies with European Standard EN421:2010.

In one embodiment, the first polymer solution is latex. In an alternate embodiment, the first polymer solution is a synthetic rubber copolymer solution. The synthetic rubber copolymer may be a solution comprising a copolymer of acetonitrile and butadiene.

In one embodiment, the first polymer solution is a solution comprising a mixture of nitrile latex, sulphur, zinc oxide, titanium dioxide, zinc dibutyldithiocarbamate ZDBC, ammonia, vultamol and potassium hydroxide.

In one embodiment, the solution the first polymer solution is a solution comprising a mixture of nitrile latex, sulphur, zinc oxide, titanium dioxide, ZDBC, ammonia, vultamol and potassium hydroxide is formed according to the mixture set forth in Table 1 below.

TABLE 1

| Chemical | Parts per hundred of rubber |
| --- | --- |
| Nitrile latex (43% v/v, initial concentration) | 100 |
| Sulpher powder | 1.34 |
| Zinc oxide | 1.74 |
| Titanium dioxide | 1.88 |
| ZDBC | 1.05 |
| Ammonia (12% v/v initial concentration) | 3.60 |
| Vultamol | 0.23 |
| Potassium hydroxide | 0.87 |

In one embodiment, the first polymer solution is the solution comprising the copolymer of acetonitrile and butadiene disclosed in WO2007105122 A1.

In one embodiment, the first polymer solution is the solution comprising the copolymer of acetonitrile and butadiene disclosed in EP1435374 A2.

In one embodiment, the first polymer solution is the solution comprising the copolymer of acetonitrile and butadiene disclosed in EP1260549 A1.

In one embodiment, the first polymer solution is the solution comprising the copolymer of acetonitrile and butadiene disclosed in EP0925329 B1.

The first polymer solution may contain additional additives, such as, for example, colorants, preservatives, fragrances, and the like.

The coagulant solution may be a calcium nitrate solution. In one embodiment the coagulant solution is a 35% w/v solution of calcium nitrate. Alternatively, the coagulant solution may be the coagulant solution disclosed in EP1638423 B1.

In one embodiment, the at least one former has a fish scale-textured surface that imparts a fish scale-texture to the ambidextrous working glove of the present invention. In one embodiment, the fish scale-textured surface of the at least one former imparts a fish scale-texture to the inner and outer surfaces of the ambidextrous working glove of the present invention. One of ordinary skill in the art can readily appreciate that not all surface textures on the at least one former are capable of imparting a surface texture to both the inner and outer surface of an ambidextrous working glove of the present invention.

In one embodiment, the measured thickness of the glove in a textured area is greater than the measured thickness of the glove measured in a non-textured area. The thickness of the glove may be measured by any suitable method, such as, for example, via the use of a micrometer.

In one embodiment, the textured surface measured thickness of the glove in a textured area is 10% greater than the measured thickness of the glove measured in a non-textured area. In an alternate embodiment, the measured thickness of the glove in a textured area is 15% greater than the measured thickness of the glove measured in a non-textured area. In an alternate embodiment, the measured thickness of the glove in a textured area is 20% greater than the measured thickness of the glove measured in a non-textured area. In an alternate embodiment, the measured thickness of the glove in a textured area is 25% greater than the measured thickness of the glove measured in a non-textured area. In an alternate embodiment, the measured thickness of the glove in a textured area is 30% greater than the measured thickness of the glove measured in a non-textured area. In an alternate embodiment, the measured thickness of the glove in a textured area is 35% greater than the measured thickness of the glove measured in a non-textured area. In an alternate embodiment, the measured thickness of the glove in a textured area is 40% greater than the measured thickness of the glove measured in a non-textured area. In an alternate embodiment, the measured thickness of the glove in a textured area is 45% greater than the measured thickness of the glove measured in a non-textured area. In an alternate embodiment, the measured thickness of the glove in a textured area is 50% greater than the measured thickness of the glove measured in a non-textured area.

In one embodiment, the textured inner and outer surfaces of the ambidextrous working glove of the present invention is formed by the direct transfer function of the surface texture of the at least one former. A preferred textured former surface for the ambidextrous working glove of the present invention has been found to be provided by at least one form that has a fish-scale textured finish Transfer texturing from such a surface provides a highly desirable textured interior and outer surfaces. The textured interior surface provides a highly desirable hand-engaging surface and the textured exterior surface provides highly desirable grip.

One of ordinary skill in the art can readily appreciate that the ability of the at least one former to impart or transfer a texture to both the inner and outer surfaces of the ambidextrous working glove of the present invention can vary in response to a variety of factors including, but not limited to the polymer forming the film of the working glove, the thickness of the working glove, and the shape and/or depth of the texture of the at least one former.

In one embodiment, 100% of the surface of the former is textured to impart or transfer a texture to both the inner and outer surfaces of the ambidextrous working glove of the present invention. In an alternate embodiment, less than 100% of the surface of the former is textured to impart or transfer a texture to both the inner and outer surfaces of the ambidextrous working glove of the present invention. In an alternate embodiment, 90% of the surface of the former is textured to impart or transfer a texture to both the inner and outer surfaces of the ambidextrous working glove of the present invention. In an alternate embodiment, 80% of the surface of the former is textured to impart or transfer a texture to both the inner and outer surfaces of the ambidextrous working glove of the present invention. In an alternate embodiment, 70% of the surface of the former is textured to impart or transfer a texture to both the inner and outer surfaces of the ambidextrous working glove of the present invention. In an alternate embodiment, 60% of the surface of the former is textured to impart or transfer a texture to both the inner and outer surfaces of the ambidextrous working glove of the present invention. In an alternate embodiment, 50% of the surface of the former is textured to impart or transfer a texture to both the inner and outer surfaces of the ambidextrous working glove of the present invention. In an alternate embodiment, 40% of the surface of the former is textured to impart or transfer a texture to both the inner and outer surfaces of the ambidextrous working glove of the present invention. In an alternate embodiment, 30% of the surface of the former is textured to impart or transfer a texture to both the inner and outer surfaces of the ambidextrous working glove of the present invention. In an alternate embodiment, 20% of the surface of the former is textured to impart or transfer a texture to both the inner and outer surfaces of the ambidextrous working glove of the present invention. In an alternate embodiment, 10% of the surface of the former is textured to impart or transfer a texture to both the inner and outer surfaces of the ambidextrous working glove of the present invention.

In one embodiment, the surface of the at least one former is textured on the front and back of the region of the at least one former that forms the fingers of the ambidextrous working glove of the present invention. In one embodiment, the surface of the at least one former is textured on the region of the at least one former that forms the palm of the ambidextrous working glove of the present invention. In one embodiment, the surface of the at least one former is textured on the region of the at least one former that forms the back of the ambidextrous working glove of the present invention. In one embodiment, the surface of the at least one former is textured on the region of the at least one former that forms the region of the thumb that faces the palm of the ambidextrous working glove of the present invention.

In one embodiment, the texture transferred or imparted to the inner and outer surfaces of the ambidextrous working glove of the present invention does not weaken the glove. In one embodiment, the texture transferred or imparted to the inner and outer surfaces of the ambidextrous working glove of the present invention does not affect removal of the glove from the at least one former.

In one embodiment, an individual fish-scale in the textured surface of the at least one former is etched into the at least one former at a depth of about 04 mm, and is about 23 mm wide and 34 mm high.

FIGS. 2a to 8b show various views of an at least one former that is used to form one embodiment of the ambidextrous working glove of the present invention, showing how the individual fish scales are etched into the at least one former.

The size of the at least one former determines the size of the ambidextrous working glove of the present invention. For example, a "small" former would be used to form a "small" glove, and so on.

Figure 3:
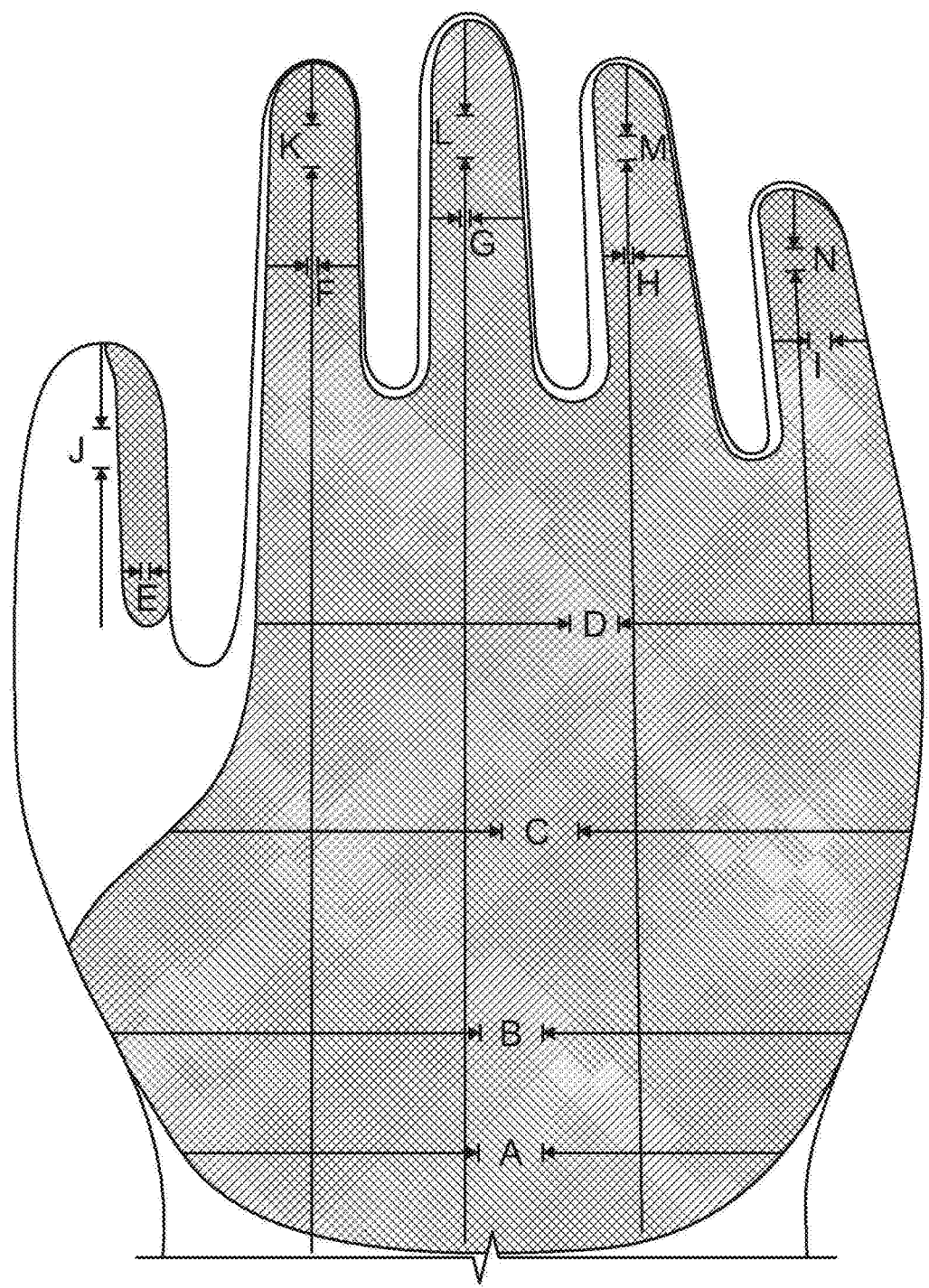
FIG. 3 shows the dimensions of the fish scale pattern etched or engraved into an at least one former used to make one embodiment of the ambidextrous working glove of the present invention.
Figure 4:
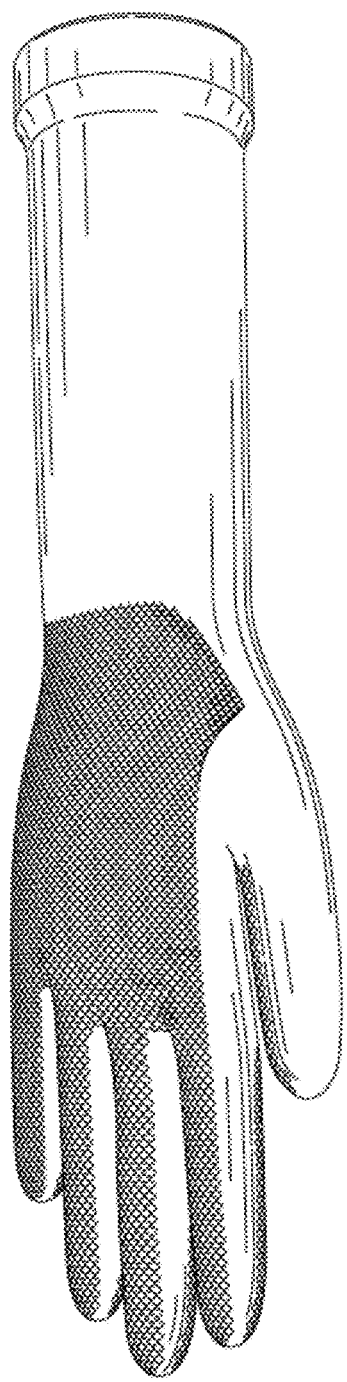
FIG. 4 shows a perspective view of an at least one former that is utilized to form one embodiment of the ambidextrous working glove of the present invention.
Figure 5:
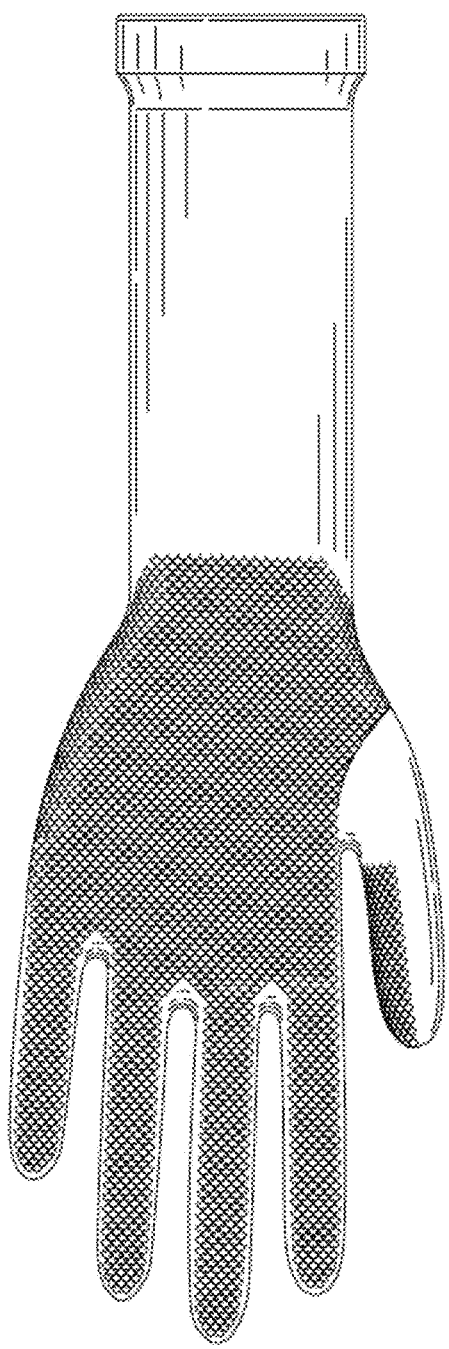
FIG. 5 shows a front view of an at least one former that is utilized to form one embodiment of the ambidextrous working glove of the present invention.
Figure 6:
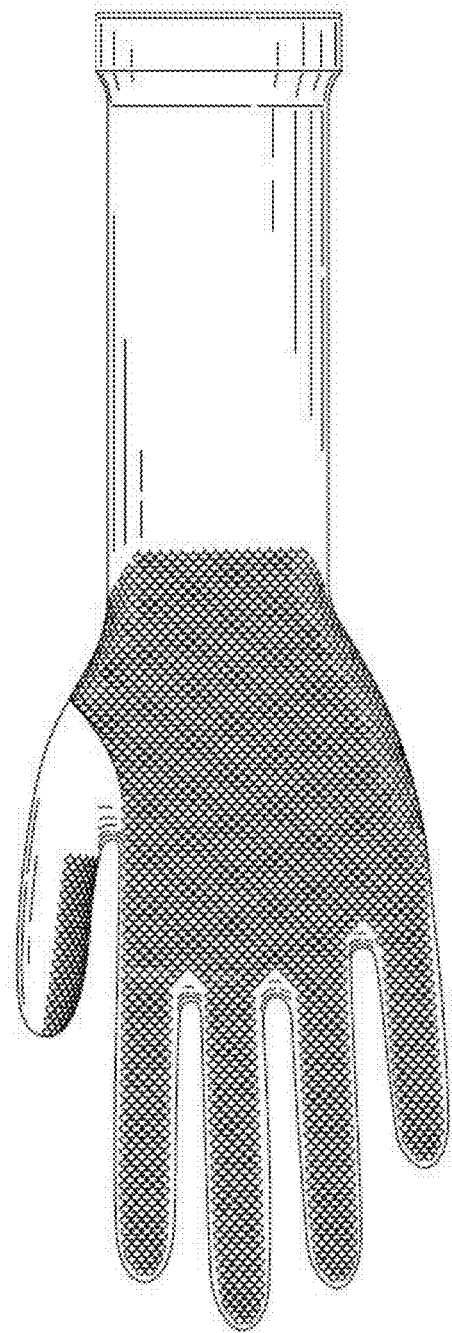
FIG. 6 shows a rear view of an at least one former that is utilized to form one embodiment of the ambidextrous working glove of the present invention.
Figure 7A:
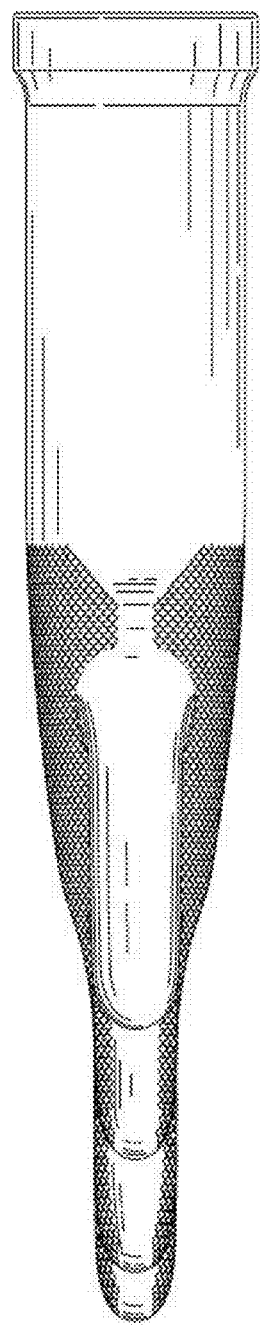
FIG. 7a shows a left view of an at least one former that is utilized to form one embodiment of the ambidextrous working glove of the present invention.
Figure 7B:
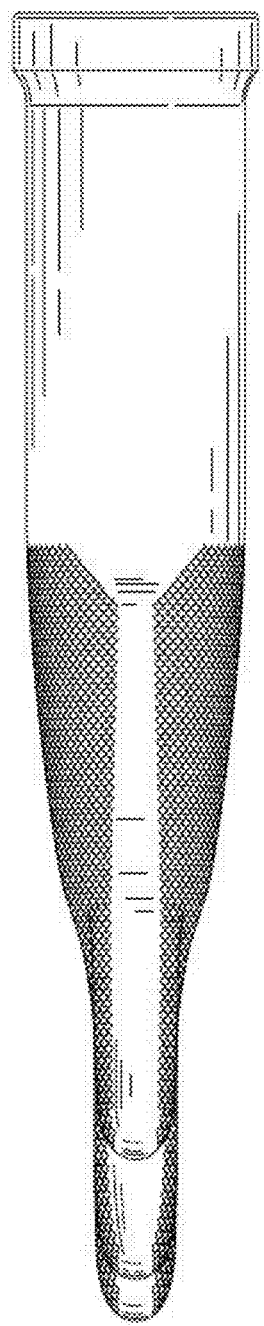
FIG. 7b shows a right view of an at least one former that is utilized to form one embodiment of the ambidextrous working glove of the present invention.

Referring to FIG. 3, showing an at least one former that is used to form one "large" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 60 mm; the width of the area shown by line "B" is 96 mm; the width of the area shown by line "C" is 83 mm; the width of the area shown by line "D" is 88 mm; the width of the area shown by line "E" is 26 mm; the width of the area shown by line "F" is 17 mm; the width of the area shown by line "G" is 19 mm; the width of the area shown by line "H" is 16 mm; the width of the area shown by line "I" is 17 mm; the length of the area shown by line "J" is 50 mm; the length of the area shown by line "K" is 195 mm; the length of the area shown by line "L" is 218 mm; the length of the area shown by line "M" is 207 mm; and the length of the area shown by line "N" is 95 mm. The width of the former indicated at line "A" is 97 mm; the width of the former indicated at line "B" is 115 mm; the width of the former indicated at line "C" is 122 mm; the width of the former indicated at line "D" is 110 mm; the width of the former indicated at line "E" is 355 mm; the width of the former indicated at line "F" is 35 mm; the width of the former indicated at line "G" is 36 mm; the width of the former indicated at line "H" is 34 mm; and the width of the former indicated at line "I" is 30 mm.

In an alternate embodiment, the former that is used to form one "small" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 45 mm; the width of the area shown by line "B" is 76 mm; the width of the area shown by line "C" is 73 mm; the width of the area shown by line "D" is 88 mm; the width of the area shown by line "E" is 16 mm; the width of the area shown by line "F" is 14 mm; the width of the area shown by line "G" is 15 mm; the width of the area shown by line "H" is 13 mm; the width of the area shown by line "I" is 13 mm; the length of the area shown by line "J" is 45 mm; the length of the area shown by line "K" is 172 mm; the length of the area shown by line "L" is 184 mm; the length of the area shown by line "M" is 172 mm; and the length of the area shown by line "N" is 85 mm. The width of the former indicated at line "A" is 825 mm; the width of the former indicated at line "B" is 955 mm; the width of the former indicated at line "C" is 106 mm; the width of the former indicated at line "D" is 885 mm; the width of the former indicated at line "E" is 29 mm; the width of the former indicated at line "F" is 29 mm; the width of the former indicated at line "G" is 31 mm; the width of the former indicated at line "H" is 30 mm; and the width of the former indicated at line "I" is 29 mm.

In an alternate embodiment, the former that is used to form one "medium" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 50 mm; the width of the area shown by line "B" is 86 mm; the width of the area shown by line "C" is 74 mm; the width of the area shown by line "D" is 79 mm; the width of the area shown by line "E" is 20 mm; the width of the area shown by line "F" is 16 mm; the width of the area shown by line "G" is 18 mm; the width of the area shown by line "H" is 15 mm; the width of the area shown by line "I" is 14 mm; the length of the area shown by line "J" is 46 mm; the length of the area shown by line "K" is 182 mm; the length of the area shown by line "L" is 195 mm; the length of the area shown by line "M" is 186 mm; and the length of the area shown by line "N" is 95 mm. The width of the former indicated at line "A" is 89 mm; the width of the former indicated at line "B" is 105 mm; the width of the former indicated at line "C" is 115 mm; the width of the former indicated at line "D" is 100 mm; the width of the former indicated at line "E" is 33 mm; the width of the former indicated at line "F" is 32 mm; the width of the former indicated at line "G" is 325 mm; the width of the former indicated at line "H" is 30 mm; and the width of the former indicated at line "I" is 275 mm.

In an alternate embodiment, the former that is used to form one "extra large" or "XL" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 66 mm; the width of the area shown by line "B" is 92 mm; the width of the area shown by line "C" is 90 mm; the width of the area shown by line "D" is 95 mm; the width of the area shown by line "E" is 26 mm; the width of the area shown by line "F" is 17 mm; the width of the area shown by line "G" is 17 mm; the width of the area shown by line "H" is 17 mm; the width of the area shown by line "I" is 16 mm; the length of the area shown by line "J" is 55 mm; the length of the area shown by line "K" is 208 mm; the length of the area shown by line "L" is 220 mm; the length of the area shown by line "M" is 208 mm; and the length of the area shown by line "N" is 105 mm. The width of the former indicated at line "A" is 101 mm; the width of the former indicated at line "B" is 115 mm; the width of the former indicated at line "C" is 134 mm; the width of the former indicated at line "D" is 116 mm; the width of the former indicated at line "E" is 375 mm; the width of the former indicated at line "F" is 38 mm; the width of the former indicated at line "G" is 375 mm; the width of the former indicated at line "H" is 35 mm; and the width of the former indicated at line "I" is 315 mm.

In an alternate embodiment, the former that is used to form one "extra extra large" or "XXL" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 67 mm; the width of the area shown by line "B" is 101 mm; the width of the area shown by line "C" is 108 mm; the width of the area shown by line "D" is 103 mm; the width of the area shown by line "E" is 23 mm; the width of the area shown by line "F" is 22 mm; the width of the area shown by line "G" is 21 mm; the width of the area shown by line "H" is 20 mm; the width of the area shown by line "I" is 19 mm; the length of the area shown by line "J" is 54 mm; the length of the area shown by line "K" is 207 mm; the length of the area shown by line "L" is 222 mm; the length of the area shown by line "M" is 211 mm; and the length of the area shown by line "N" is 100 mm. The width of the former indicated at line "A" is 109 mm; the width of the former indicated at line "B" is 119 mm; the width of the former indicated at line "C" is 140 mm; the width of the former indicated at line "D" is 126 mm; the width of the former indicated at line "E" is 40 mm; the width of the former indicated at line "F" is 40 mm; the width of the former indicated at line "G" is 41 mm; the width of the former indicated at line "H" is 38 mm; and the width of the former indicated at line "I" is 38 mm.

In an alternate embodiment, the former that is used to form one "extra extra extra large" or "XXXL" sized embodiment of the ambidextrous working glove of the present invention, the area of the former that is textured to impart or transfer a texture to both the inner and outer surfaces of the ambidextrous working glove of the present invention is defined as follows: The width of the area shown by line "A" is 62 mm; the width of the area shown by line "B" is 103 mm; the width of the area shown by line "C" is 112 mm; the width of the area shown by line "D" is 110 mm; the width of the area shown by line "E" is 24 mm; the width of the area shown by line "F" is 20 mm; the width of the area shown by line "G" is 20 mm; the width of the area shown by line "H" is 20 mm; the width of the area shown by line "I" is 18 mm; the length of the area shown by line "J" is 54 mm; the length of the area shown by line "K" is 205 mm; the length of the area shown by line "L" is 224 mm; the length of the area shown by line "M" is 212 mm; and the length of the area shown by line "N" is 105 mm. The width of the former indicated at line "A" is 124 mm; the width of the former indicated at line "B" is 144 mm; the width of the former indicated at line "C" is 156 mm; the width of the former indicated at line "D" is 136 mm; the width of the former indicated at line "E" is 405 mm; the width of the former indicated at line "F" is 39 mm; the width of the former indicated at line "G" is 40 mm; the width of the former indicated at line "H" is 375 mm; and the width of the former indicated at line "I" is 34 mm.

The textured inner and outer surfaces of one embodiment of the ambidextrous working glove of the present invention can be seen in greater detail in FIGS. 9 to 11 and FIGS. 17 to 18. A graphical representation of the fish-scale textured outer surface of an ambidextrous working glove of the present invention is shown in FIGS. 12 to 17. A graphical representation of the fish-scale textured inner surface of an ambidextrous working glove of the present invention is show in FIG. 18.

Figure 9:
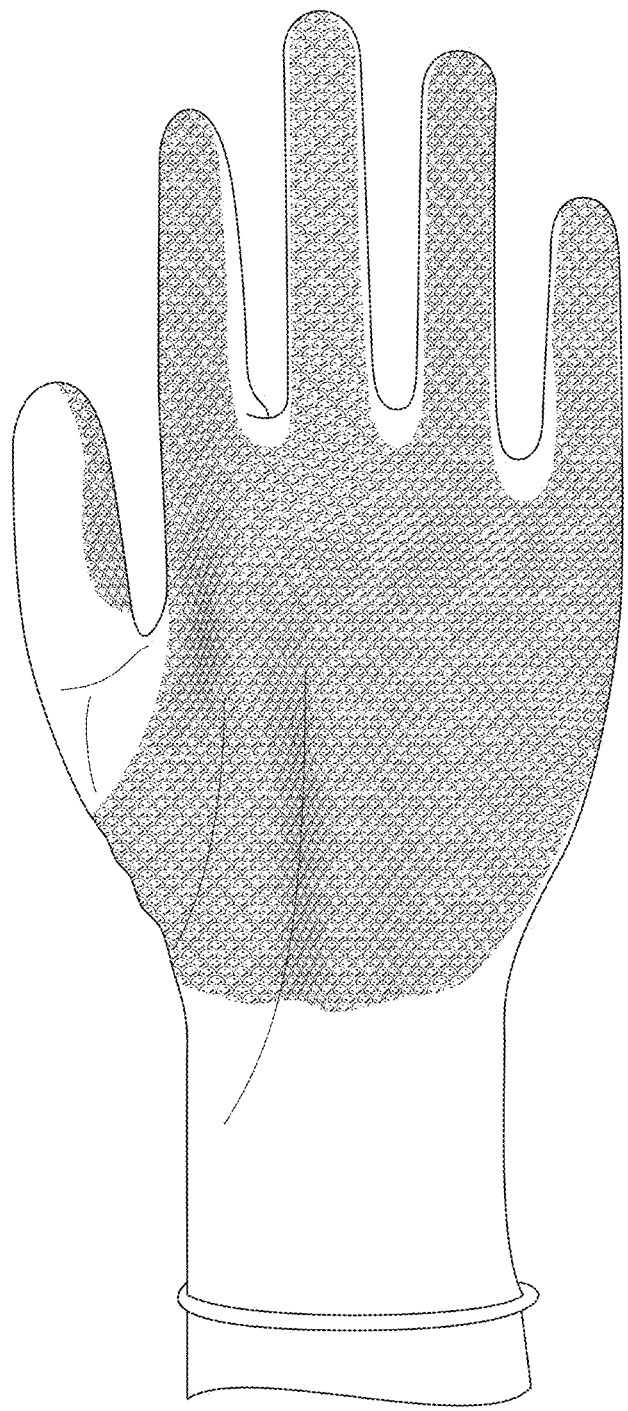
FIG. 9 shows one embodiment of the ambidextrous working glove of the present invention on an at least one former prior to stripping from the former.

Further, as illustrated in the embodiment of FIG. 9, the interior surface of the ambidextrous working glove can have portions with an textured gripping pattern and also non-textured portions. As shown in FIG. 9, the non-textured portions are located between each of the four fingers of ambidextrous working glove and on a thumb facing away from the four fingers.

Figure 10A:
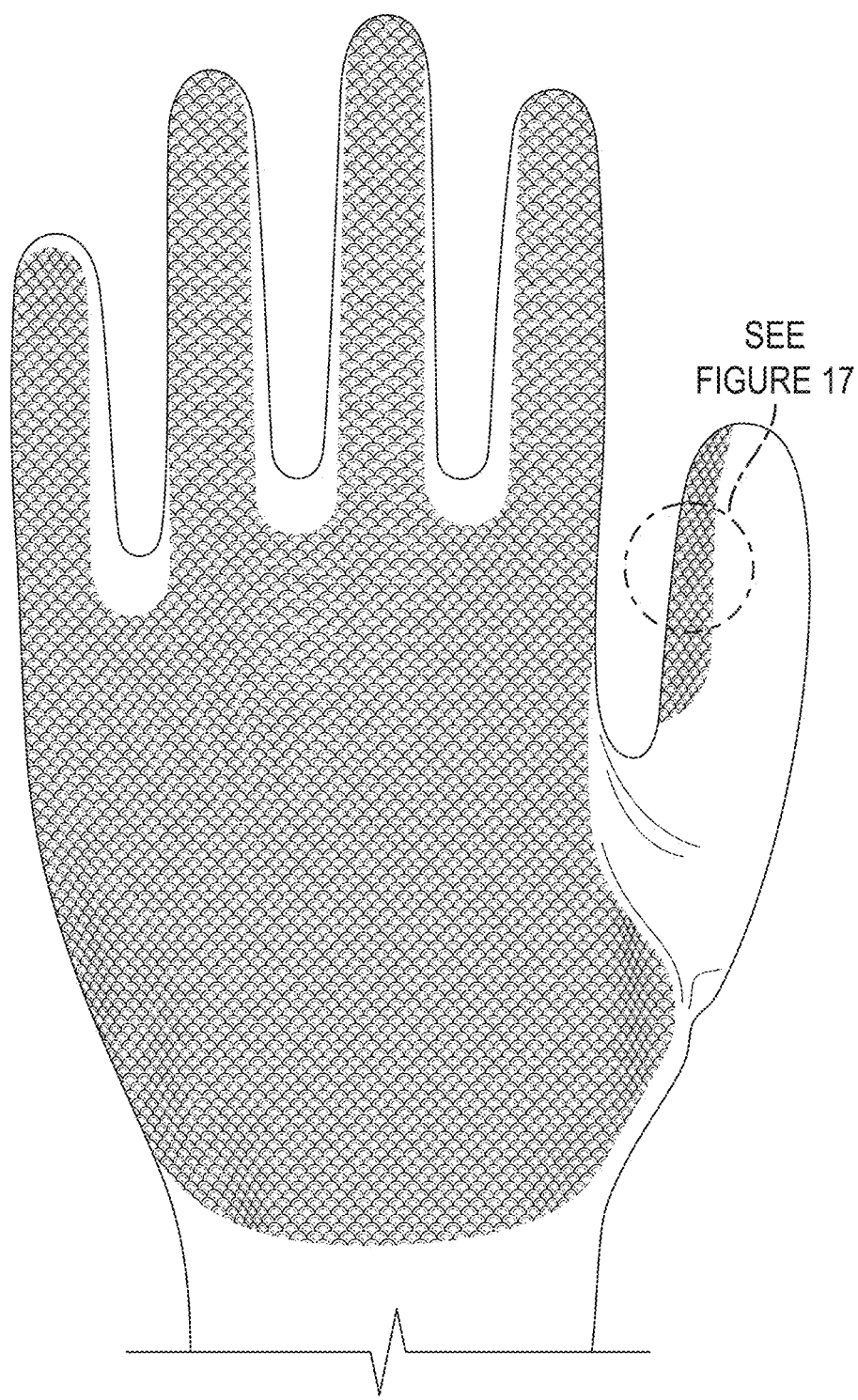
FIG. 10a shows the palm of one embodiment of the ambidextrous working glove of the present invention.
Figure 10B:
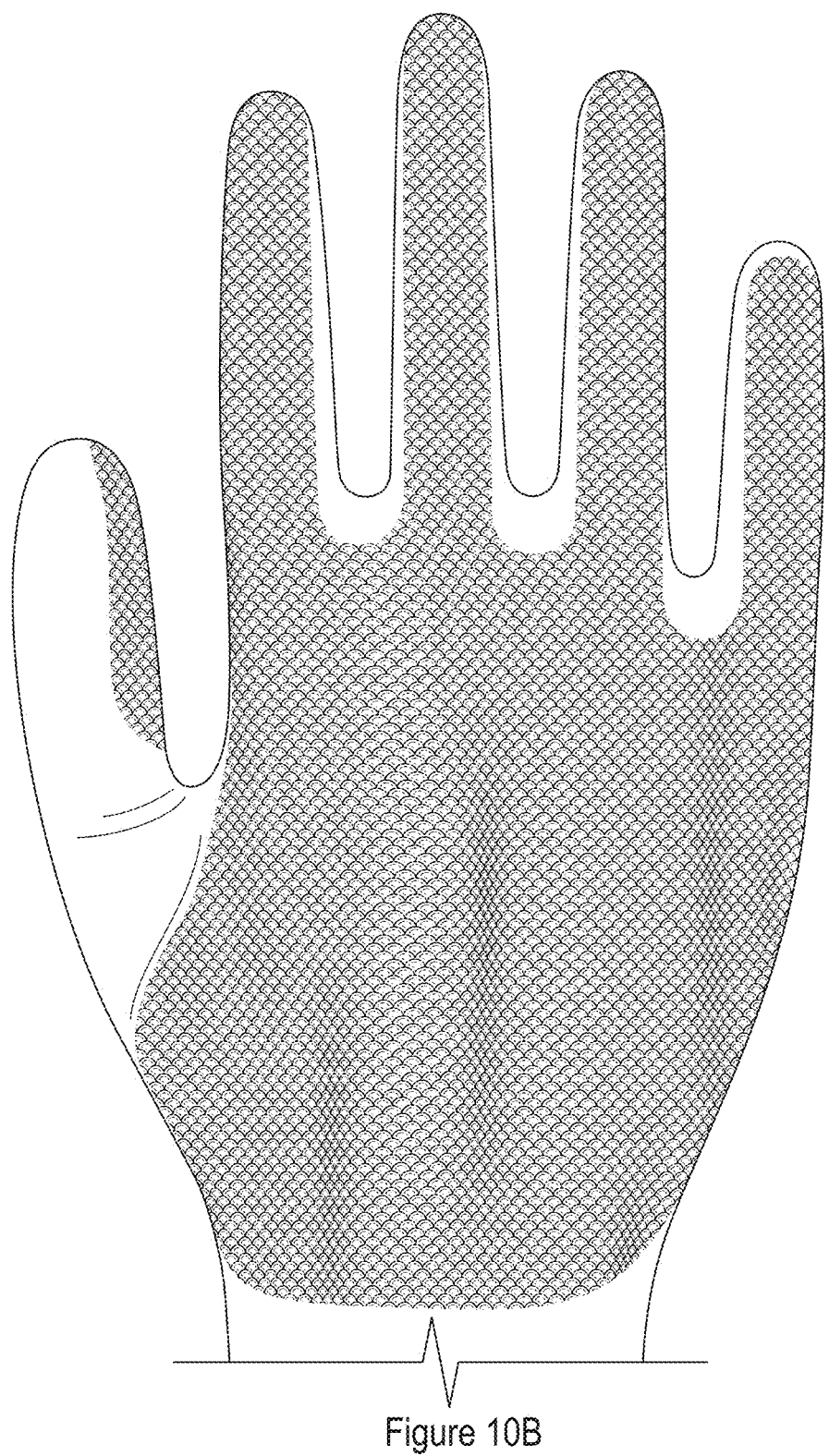
FIG. 10b shows the back of one embodiment of the wearable glove of the present invention.
Figure 12:
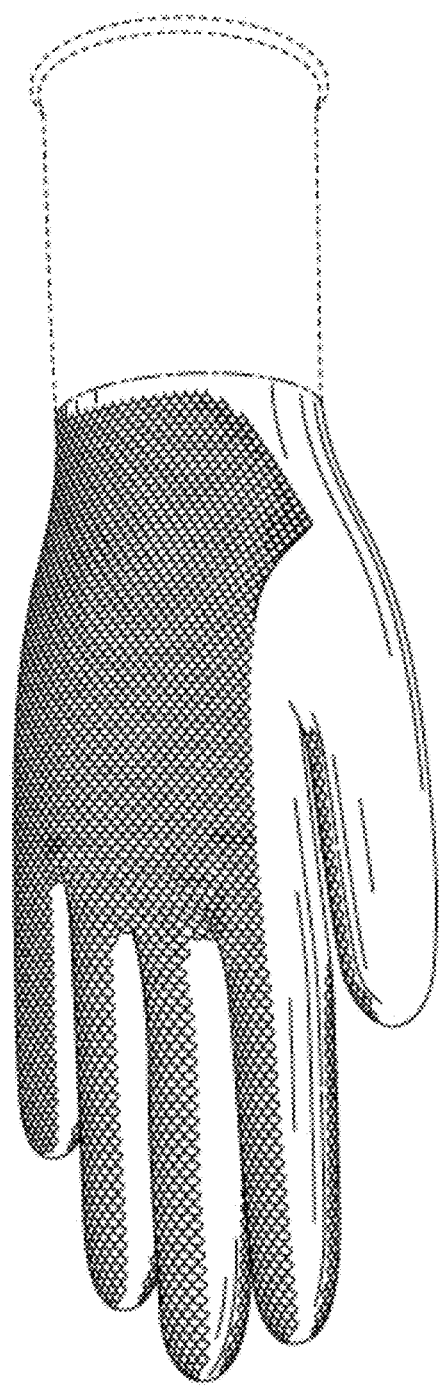
FIG. 12 shows a perspective view of one embodiment of the ambidextrous working glove of the present invention.
Figure 13:
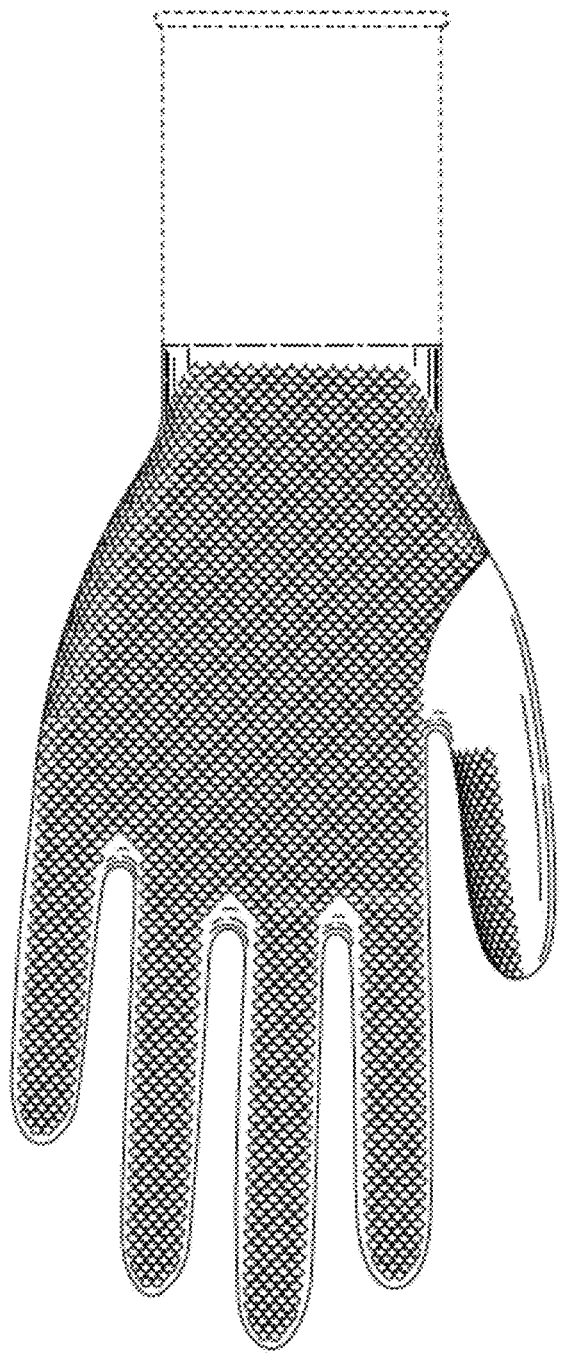
FIG. 13 shows a front view of one embodiment of the ambidextrous working glove of the present invention.
Figure 14:
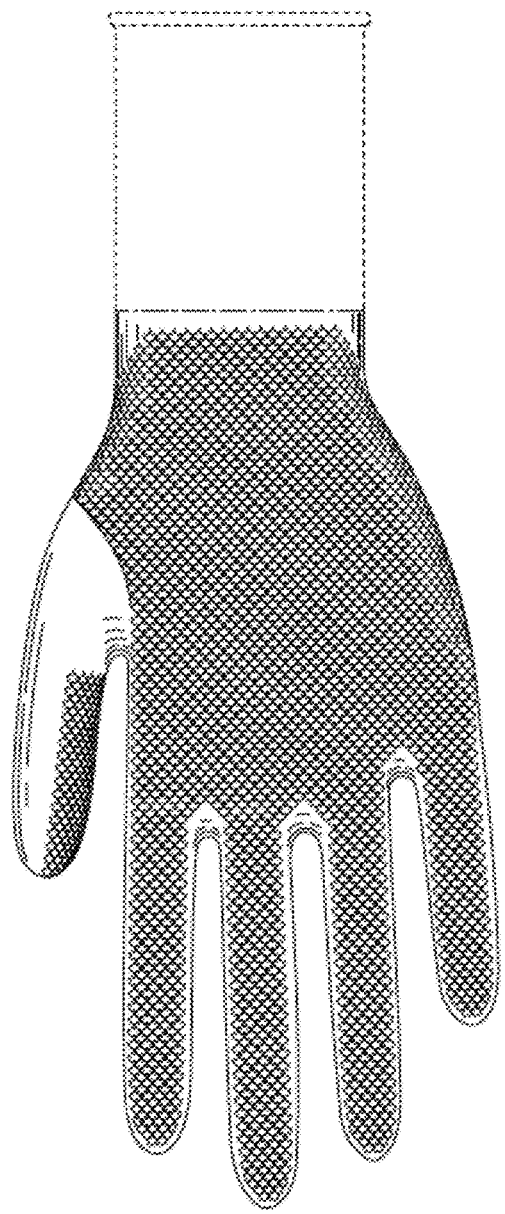
FIG. 14 shows a rear view of one embodiment of the ambidextrous working glove of the present invention.
Figure 15A:
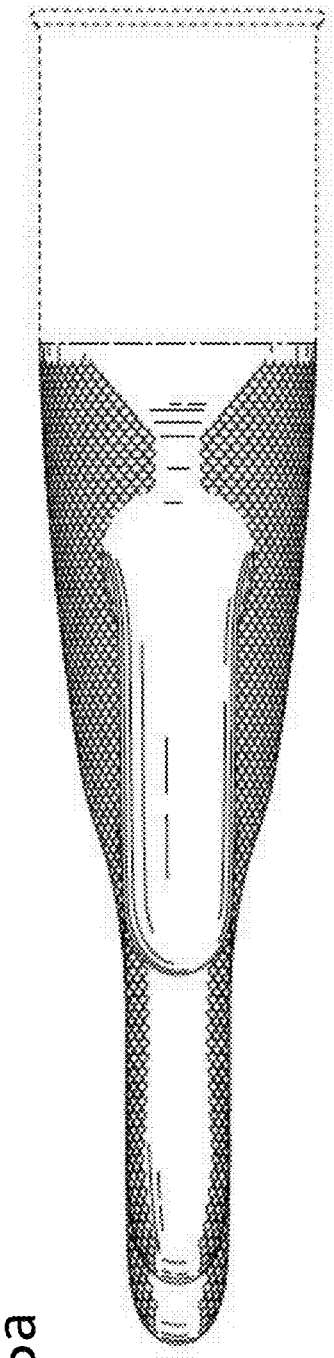
FIG. 15a shows a left view of one embodiment of the ambidextrous working glove of the present invention.
Figure 15B:
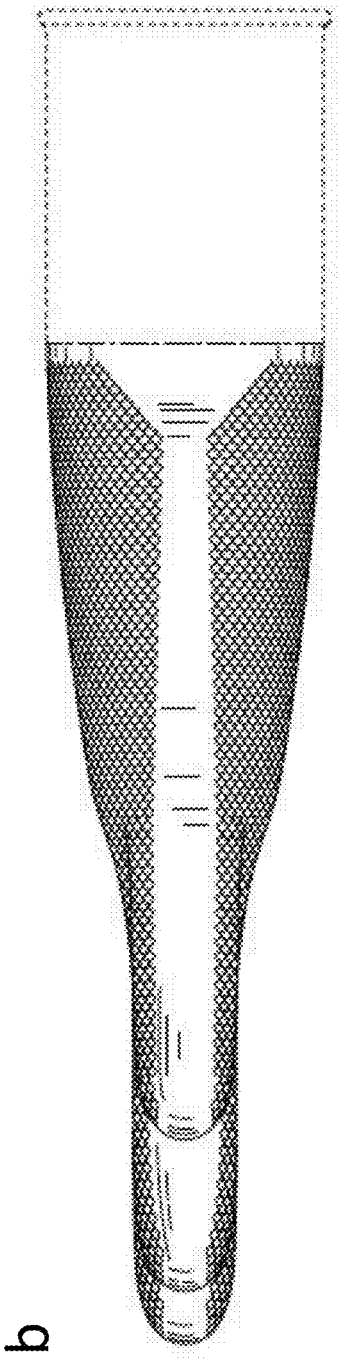
FIG. 15b shows a right view of one embodiment of the ambidextrous working glove of the present invention.

Referring to FIG. 17, FIG. 17 is an enlarged portion 1000 of the thumb region of the embodiment of the ambidextrous working glove of FIG. 10. The enlarged portion 1000 illustrates an external textured gripping pattern which includes depressions 1002 surrounded by protruding ridges 1004. As stated elsewhere in this disclosure, the external textured gripping pattern, which is shown in the enlarged portion 1000 in FIG. 17 with depressions 1002 and ridges 1004, can be formed by the direct transfer function of the surface texture of the at least one former.

Figure 18:
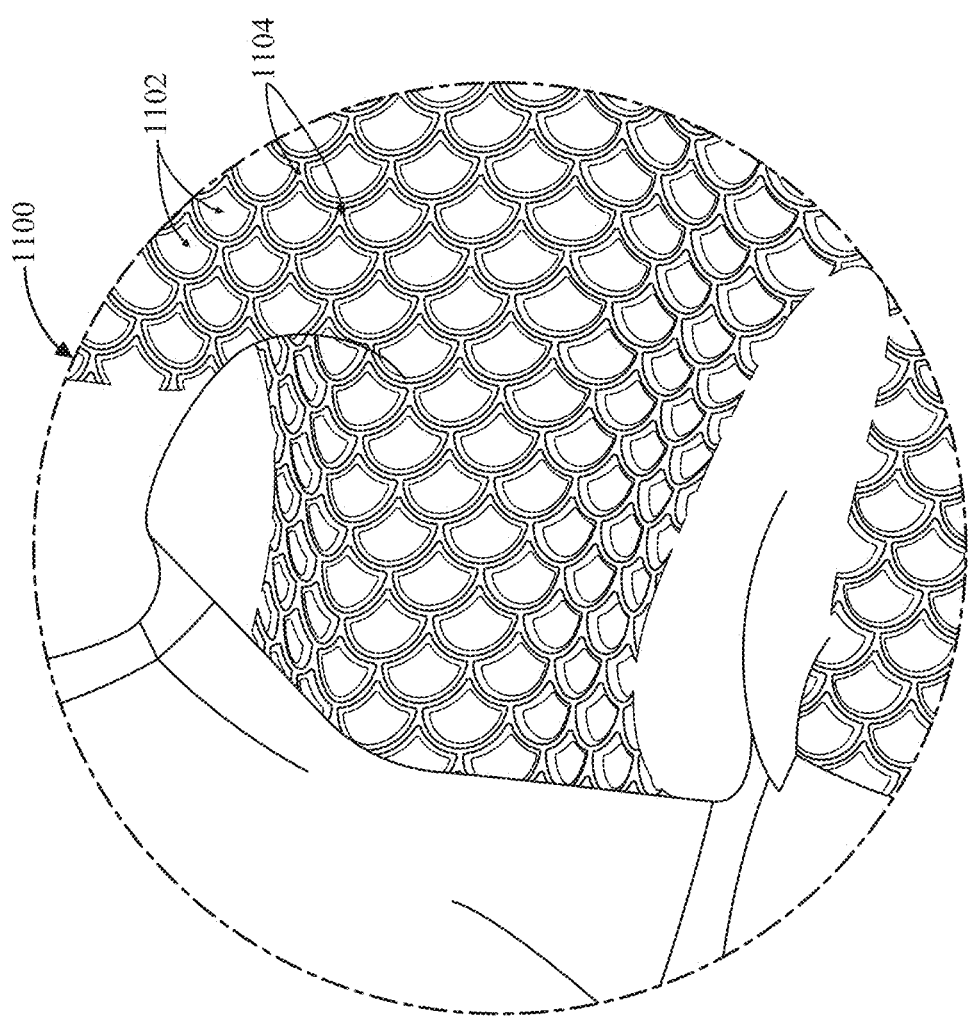
FIG. 18 shows an enlarged portion of the inner surface of a finger of the ambidextrous working glove of FIG. 11.

Referring to FIG. 18, FIG. 18 is an enlarged portion 1100 of the inner surface of the embodiment of the ambidextrous working glove of FIG. 11. The enlarged portion 1100 better illustrates an internal textured gripping pattern which includes islands 1102 surrounded by channels 1104. The islands 1102 and channels 1104 of the internal textured gripping pattern can be formed by the direct transfer function of the surface texture of the at least one former. Further, as illustrated in the embodiments of FIG. 11 and FIG. 18, the interior surface of the ambidextrous working glove can have textured and non-textured portions. As shown in FIG. 11, the non-textured portions can be located between each of the four fingers of the ambidextrous working glove.

Figure 16B:
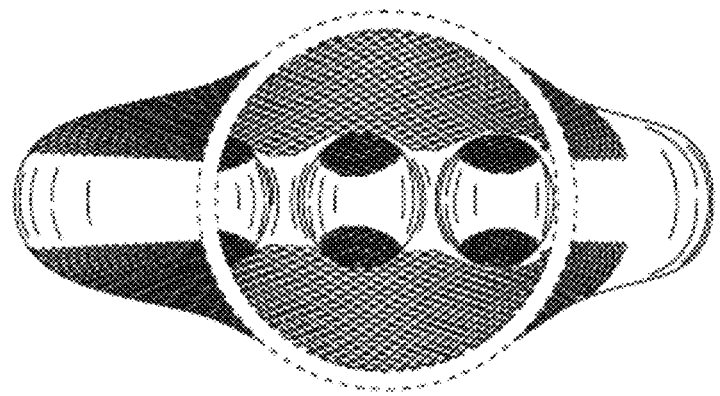
FIG. 16b shows a bottom view of one embodiment of the ambidextrous working glove of the present invention.
Figure 16A:
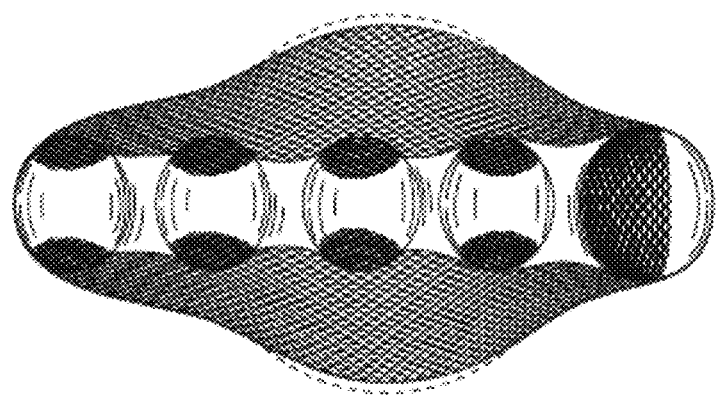
FIG. 16a shows a top view of one embodiment of the ambidextrous working glove of the present invention.

Referring to FIG. 16A, FIG. 16A includes non-textured portions 1606 on the exterior surface of the ambidextrous working glove located between each of the four fingers and on a thumb region, facing away from the four fingers. Similarly, FIG. 16B includes a non-textured portion 1608 on the interior surface of the ambidextrous working glove located between each of the four fingers of the ambidextrous working glove and on a thumb region, facing away from the four fingers.

Figure 8B:
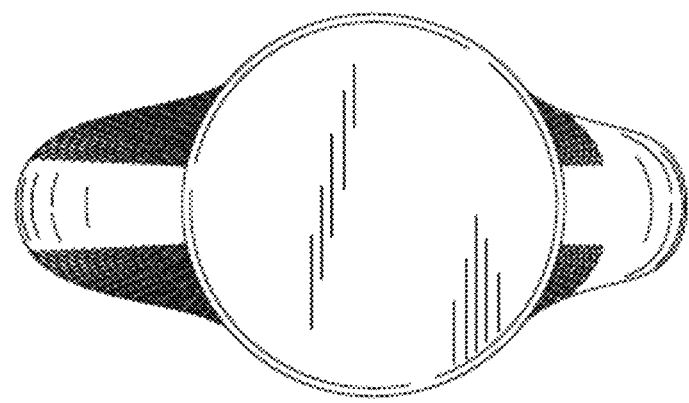
FIG. 8b shows a bottom view of an at least one former that is utilized to form one embodiment of the ambidextrous working glove of the present invention.
Figure 8A:
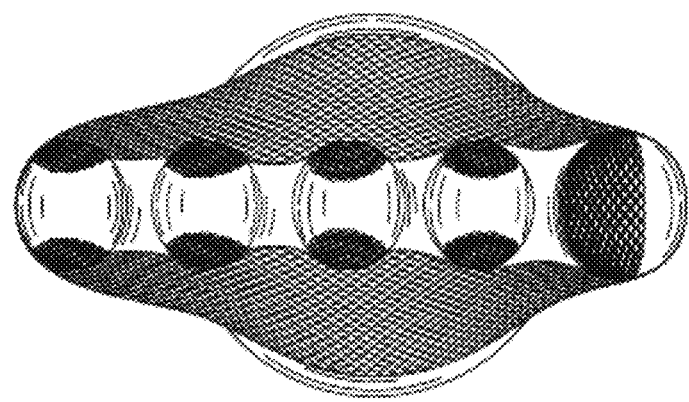
FIG. 8a shows a top view of an at least one former that is utilized to form one embodiment of the ambidextrous working glove of the present invention.

With reference to FIG. 8B, a thickness 800 of the ambidextrous working glove at a non-textured portion is shown as extending between the exterior surface and the interior surface of the ambidextrous working glove at locations that are non-textured. As illustrated and described with reference to the embodiment of FIG. 8B, the ambidextrous working glove of the present invention can have a measured thickness 800 in a non-textured area selected from the range of thicknesses spanning from about 6 mil to about 10 mil.

In one embodiment, the ambidextrous working glove of the present invention has a weight of about 20 g. In an alternate embodiment, the ambidextrous working glove of the present invention has a weight of about 19 g. In an alternate embodiment, the ambidextrous working glove of the present invention has a weight of about 18 g. In an alternate embodiment, the ambidextrous working glove of the present invention has a weight of about 17 g. In an alternate embodiment, the ambidextrous working glove of the present invention has a weight of about 16 g. In an alternate embodiment, the ambidextrous working glove of the present invention has a weight of about 15 g. In an alternate embodiment, the ambidextrous working glove of the present invention has a weight of about 14 g. In an alternate embodiment, the ambidextrous working glove of the present invention has a weight of about 13 g. In an alternate embodiment, the ambidextrous working glove of the present invention has a weight of about 12 g. In an alternate embodiment, the ambidextrous working glove of the present invention has a weight of about 11 g. In an alternate embodiment, the ambidextrous working glove of the present invention has a weight of about 10 g.

In one embodiment, the ambidextrous working glove of the present invention complies with European Standard EN420:2003 and A1:2009 clause 5 sizing and dexterity regulations.

In one embodiment, the ambidextrous working glove of the present invention complies with European Standard BS EN374:2003 chemical and micro-organism protection regulations.

In one embodiment, second polymer solution is a solution that allows the ambidextrous working glove of the present invention to slide over a wearer's hand while the glove is being donned. In one embodiment, the second polymer solution is a polyurethane solution.

In one embodiment, the second polymer solution is a solution comprising polyurethane 10% v/v final concentration, and 12% ammonia 2% final concentration in water.

In one embodiment, the second polymer solution forms a chlorinated film on the inner surface of the ambidextrous working glove of the present invention. In one embodiment, the second polymer solution forms a chlorinated film on the inner surface of the ambidextrous working glove of the present invention according to the methods described in WO2010023634. In one embodiment, the second polymer solution is a polyisoprene solution. In one embodiment, the polyisoprene solution is the polyisoprene solution described in EP2381100 A1.

The present invention is further illustrated, but not limited by, the following examples:

EXAMPLES

Example 1: Testing Embodiments of the Ambidextrous Working Glove of the Present Invention for Resistance to Permeation by Chemicals According to BS EN 374-3:2003

Samples of powder-free 8 mil black, 10 mil black and 8 mil blue nitrile gloves were tested in accordance with BS EN 374:2003 part 3. The results are shown in the tables below. The permeation performance levels are defined as follows: Level 1 is defined as an observed measured breakthrough time of greater than 10 minutes. Level 2 is defined as an observed measured breakthrough time of greater than 30 minutes. Level 3 is defined as an observed measured breakthrough time of greater than 60 minutes. Level 4 is defined as an observed measured breakthrough time of greater than 120 minutes. Level 5 is defined as an observed measured breakthrough time of greater than 240 minutes. Level 6 is defined as an observed measured breakthrough time of greater than 480 minutes.

TABLE 2

Results Obtained from 8-mil Powder-Free Black Nitrile Gloves Tested According to BS EN 374:2003, part 3, using Methanol as the Testing Agent

| Test/Property | Specimen | Results | Performance |
|---|---|---|---|
| BS EN 374-3:2003 Chemical Permeation | Nitrile disposable gloves. Powder-free. 8 mil black | Chemical: Methanol CAS No: 67-56-1 Detection system: GC FID Collection medium: Dry air Loop System: Open Test Temperature: 23° C. | The samples tested did not meet with the minimum breakthrough time for a performance level 1 to be achieved |

| | Sample thickness (mm) | Breakthrough time (mins) |
|---|---|---|
| 1 | 0.24 | 1 |
| 2 | 0.27 | 3 |
| 3 | 0.23 | <1 |
| Mean | 0.25 | 1 |
| Lowest Result | — | <1 |

| Appearance of sample after testing | No change |
|---|---|

TABLE 3

Results Obtained from 8-mil Powder-Free Black Nitrile Gloves Tested According to BS EN 374:2003, part 3, using n-Heptane as the Testing Agent

| Test/Property | Specimen | Results | Performance |
|---|---|---|---|
| BS EN 374-3:2003 Chemical Permeation | Nitrile disposable gloves. Powder-free. 8 mil black | Chemical: n-Heptane CAS No: 142-82-5 Detection system: GC FID Collection medium: Dry air Loop System: Open Test Temperature: 23° C. | Level 1 |

| | Sample thickness (mm) | Breakthrough time (mins) |
|---|---|---|
| 1 | 0.28 | 22 |
| 2 | 0.28 | 56 |
| 3 | 0.27 | 26 |
| Mean | 0.28 | 34 |
| Lowest Result | — | 22 |

| Appearance of sample after testing | No change |
|---|---|

TABLE 4

Results Obtained from 8-mil Powder-Free Black Nitrile Gloves Tested According to BS EN 374:2003, part 3, using Acetonitrile as the Testing Agent

| Test/Property | Specimen | Results | Performance |
|---|---|---|---|
| BS EN 374-3:2003 Chemical Permeation | Nitrite disposable gloves. Powder-free. 8 mil black | Chemical: Acetonitrile<br>CAS No: 75-05-8<br>Detection system: GC FID<br>Collection medium: Dry air<br>Loop System: Closed<br>Test Temperature: 23° C. | Level 6 |

|  | Sample thickness (mm) | Breakthrough time (mins) |
|---|---|---|
| 1 | 0.29 | <1 |
| 2 | 0.27 | <1 |
| 3 | 0.26 | <1 |
| Mean | 0.27 | <1 |
| Lowest Result | — | <1 |

| Appearance of sample after testing | No change |
|---|---|

TABLE 5

Results Obtained from 8-mil Powder-Free Black Nitrile Gloves Tested According to BS EN 374:2003, part 3, using 40% Sodium Hydroxide as the Testing Agent

| Test/Property | Specimen | Results | Performance |
|---|---|---|---|
| BS EN 374-3:2003 Chemical Permeation | Nitrite disposable gloves. Powder-free. 8 mil black | Chemical: 40% Sodium hydroxide<br>CAS No: 1310-73-2<br>Detection system: Conductivity<br>Collection medium: De ionized water<br>Loop System: Closed<br>Test Temperature: 23° C. | Level 6 |

|  | Sample thickness (mm) | Breakthrough time (mins) |
|---|---|---|
| 1 | 0.32 | >480 |
| 2 | 0.32 | >480 |
| 3 | 0.32 | >480 |
| Mean | 0.32 | >480 |
| Lowest Result | — | >480 |

| Appearance of sample after testing | No change |
|---|---|

TABLE 6

Results Obtained from 10-mil Powder-Free Black Nitrile Gloves Tested According to BS EN 374:2003, part 3, using Methanol as the Testing Agent

| Test/Property | Specimen | Results | Performance |
|---|---|---|---|
| BS EN 374-3:2003 Chemical Permeation | Nitrile disposable gloves. Powder-free. 10 mil black | Chemical: Methanol<br>CAS No: 67-56-1<br>Detection system: GC FID<br>Collection medium: Dry air<br>Loop System: Open<br>Test Temperature: 23° C. | The samples tested did not meet with the minimum breakthrough time for a performance level 1 to be achieved |

|  | Sample thickness (mm) | Breakthrough time (mins) |
|---|---|---|
| 1 | 0.38 | 1 |
| 2 | 0.32 | 4 |

TABLE 6-continued

Results Obtained from 10-mil Powder-Free Black Nitrile Gloves Tested According to BS EN 374:2003, part 3, using Methanol as the Testing Agent

| | | |
|---|---|---|
| 3 | 0.35 | <1 |
| Mean | 0.35 | 2 |
| Lowest Result | — | <1 |

| | |
|---|---|
| Appearance of sample after testing | No change |

TABLE 7

Results Obtained from 10-mil Powder-Free Black Nitrile Gloves Tested According to BS EN 374:2003, part 3, using n-Heptane as the Testing Agent

| Test/Property | Specimen | Results | Performance |
|---|---|---|---|
| BS EN 374-3:2003 Chemical Permeation | Nitrile disposable gloves. Powder-free. 10 mil black | Chemical: n-Heptane CAS No: 142-82-5 Detection system: GC FID Collection medium: Dry air Loop System: Open Test Temperature: 23° C. | Level 3 |

| | Sample thickness (mm) | Breakthrough time (mins) |
|---|---|---|
| 1 | 0.32 | 92 |
| 2 | 0.35 | 77 |
| 3 | 0.32 | 99 |
| Mean | 0.33 | 89 |
| Lowest Result | — | 77 |

| | |
|---|---|
| Appearance of sample after testing | No change |

TABLE 8

Results Obtained from 10-mil Powder-Free Black Nitrile Gloves Tested According to BS EN 374:2003, part 3, using Acetonitrile as the Testing Agent

| Test/Property | Specimen | Results | Performance |
|---|---|---|---|
| BS EN 374-3:2003 Chemical Permeation | Nitrile disposable gloves. Powder-free. 10 mil black | Chemical: Acetonitrile CAS No: 75-05-8 Detection system: GC FID Collection medium: Dry air Loop System: Open Test Temperature: 23° C. | The samples tested did not meet with the minimum breakthrough time for a performance level 1 to be achieved |

| | Sample thickness (mm) | Breakthrough time (mins) |
|---|---|---|
| 1 | 0.31 | <1 |
| 2 | 0.37 | <1 |
| 3 | 0.32 | <1 |
| Mean | 0.33 | <1 |
| Lowest Result | — | <1 |

| | |
|---|---|
| Appearance of sample after testing | No change |

TABLE 9

Results Obtained from 10-mil Powder-Free Black Nitrile Gloves Tested According to BS EN 374:2003, part 3, using 40% Sodium Hydroxide as the Testing Agent

| Test/Property | Specimen | Results | Performance |
|---|---|---|---|
| BS EN 374-3:2003 Chemical Permeation | Nitrile disposable gloves. Powder-free. 10 mil black | Chemical: 40% Sodium hydroxide<br>CAS No: 1310-73-2<br>Detection system: Conductivity<br>Collection medium: De ionized water<br>Loop System: Closed<br>Test Temperature: 23° C. | Level 6 |

| | Sample thickness (mm) | Breakthrough time (mins) |
|---|---|---|
| 1 | 0.30 | >480 |
| 2 | 0.32 | >480 |
| 3 | 0.35 | >480 |
| Mean | 0.32 | >480 |
| Lowest Result | — | >480 |

| Appearance of sample after testing | No change |
|---|---|

TABLE 10

Results Obtained from 8-mil Powder-Free Blue Nitrile Gloves Tested According to BS EN 374:2003, part 3, using Methanol as the Testing Agent

| Test/Property | Specimen | Results | Performance |
|---|---|---|---|
| BS EN 374-3:2003 Chemical Permeation | Nitrile disposable gloves. Powder-free. 8 mil blue | Chemical: Methanol<br>CAS No: 67-56-1<br>Detection system: GC FID<br>Collection medium: Dry air<br>Loop System: Open<br>Test Temperature: 23° C. | The samples tested did not meet with the minimum breakthrough time for a performance level 1 to be achieved |

| | Sample thickness (mm) | Breakthrough time (mins) |
|---|---|---|
| 1 | 0.24 | <1 |
| 2 | 0.26 | <1 |
| 3 | 0.25 | <1 |
| Mean | 0.25 | <1 |
| Lowest Result | — | <1 |

| Appearance of sample after testing | Discolored |
|---|---|

TABLE 11

Results Obtained from 8-mil Powder-Free Blue Nitrile Gloves Tested According to BS EN 374:2003, part 3, using n-Heptane as the Testing Agent

| Test/Property | Specimen | Results | Performance |
|---|---|---|---|
| BS EN 374-3:2003 Chemical Permeation | Nitrile disposable gloves. Powder-free. 8 mil blue | Chemical: n-Heptane<br>CAS No: 142-82-5<br>Detection system: GC FID<br>Collection medium: Dry air<br>Loop System: Open<br>Test Temperature: 23° C. | Level 5 |

| | Sample thickness (mm) | Breakthrough time (mins) |
|---|---|---|
| 1 | 0.24 | 256 |
| 2 | 0.26 | 258 |

TABLE 11-continued

Results Obtained from 8-mil Powder-Free Blue Nitrile Gloves Tested According to BS EN 374:2003, part 3, using n-Heptane as the Testing Agent

| | | |
|---|---|---|
| 3 | 0.28 | 260 |
| Mean | 0.26 | 258 |
| Lowest Result | — | 256 |

| | |
|---|---|
| Appearance of sample after testing | No change |

TABLE 12

Results Obtained from 8-mil Powder-Free Blue Nitrile Gloves Tested According to BS EN 374:2003, part 3, using Acetonitrile as the Testing Agent

| Test/Property | Specimen | Results | Performance |
|---|---|---|---|
| BS EN 374-3:2003 Chemical Permeation | Nitrile disposable gloves. Powder-free. 8 mil blue | Chemical: Acetonitrile CAS No: 75-05-8 Detection system: GC FID Collection medium: Dry air Loop System: Open Test Temperature: 23° C. | The samples tested did not meet with the minimum breakthrough time for a performance level 1 to be achieved |

| | Sample thickness (mm) | Breakthrough time (mins) |
|---|---|---|
| 1 | 0.22 | <1 |
| 2 | 0.25 | <1 |
| 3 | 0.21 | <1 |
| Mean | 0.23 | <1 |
| Lowest Result | — | <1 |

| | |
|---|---|
| Appearance of sample after testing | No change |

TABLE 13

Results Obtained from 8-mil Powder-Free Blue Nitrile Gloves Tested According to BS EN 374:2003, part 3, using 40% Sodium Hydroxide as the Testing Agent

| Test/Property | Specimen | Results | Performance |
|---|---|---|---|
| BS EN 374-3:2003 Chemical Permeation | Nitrile disposable gloves. Powder-free. 8 mil blue | Chemical: 40% Sodium hydroxide CAS No: 1310-73-2 Detection system: Conductivity Collection medium: De ionized water Loop System: Closed Test Temperature: 23° C. | Level 6 |

| | Sample thickness (mm) | Breakthrough time (mins) |
|---|---|---|
| 1 | 0.26 | >480 |
| 2 | 0.22 | >480 |
| 3 | 0.24 | >480 |
| Mean | 0.24 | >480 |
| Lowest Result | — | >480 |

| | |
|---|---|
| Appearance of sample after testing | No change |

Example 2: Testing Embodiments of the Ambidextrous Working Glove of the Present Invention for Sizing and Dexterity According to EN 420:2003+A1:2009 Clause 5

Samples of powder-free 8 mil black, 10 mil black and 8 mil blue nitrile gloves were tested in accordance with EN 420:2003+A1:2009 Clause 5. The results are shown in the tables below.

The permeation performance levels are defined as follows: For sizing, the minimum size for a size 6 glove is 220 mm; the minimum size for a size 7 glove is 230 mm; the minimum size for a size 8 glove is 240 mm; the minimum size for a size 9 glove is 250 mm; the minimum size for a size 10 glove is 260 mm; the minimum size for a size 11 glove is 270 mm. For dexterity, level 1 is defined as a wearer picking up an 11 mm diameter pin; level 2 is defined as a wearer picking up a 9 5 mm diameter pin; level 3 is defined as a wearer picking up an 8 mm diameter pin; level 4 is defined as a wearer picking up a 6 mm diameter pin; level 5 is defined as a wearer picking up a 5 mm diameter pin.

TABLE 14

Results Obtained from 8-mil Powder-Free Black Nitrile Gloves

| EN 420: 2003 + A1:2009 CLAUSE/TEST | EN 420: 2003 + A1:2009 REQUIREMENT | TEST RESULTS | | UoM (See note 1) | RESULT |
|---|---|---|---|---|---|
| 5.1 Glove length | See table 2 | Size XXL (11) | Length/mm L: 305, R: 290 | +0.3 mm | PASS |
| 5.1 Comfort and fit | See table 2 | Size XXL (11) Wearer hand size Left: L: 11, C: 8.5 Right: L: 11, C: 8.5 Comments on fit: Thumb slightly long | | N/A | PASS |
| 5.2 Dexterity | See table 2 | Size XXL (11) | Minimum pin diameter/mm 5.0 | N/A | Level 5 |

TABLE 15

Results Obtained from 10-mil Powder-Free Black Nitrile Gloves

| EN 420: 2003 + A1:2009 CLAUSE/TEST | EN 420: 2003 + A1:2009 REQUIREMENT | TEST RESULTS | | UoM (See note 1) | RESULT |
|---|---|---|---|---|---|
| 5.1 Glove length | See table 2 | Size XXL (11) | Length/mm L: 307, R: 303 | +0.3 mm | PASS |
| 5.1 Comfort and fit | See table 2 | Size XXL (11) Wearer hand size Left: L: 11, C: 8.5 Right: L: 11, C: 8.5 Comments on fit: Thumb slightly long | | N/A | PASS |
| 5.2 Dexterity | See table 2 | Size XXL (11) | Minimum pin diameter/mm 5.0 | N/A | Level 5 |

TABLE 16

Results Obtained from 8-mil Powder-Free Blue Nitrile Gloves

| EN 420: 2003 + A1:2009 CLAUSE/TEST | EN 420: 2003 + A1:2009 REQUIREMENT | TEST RESULTS | | UoM (See note 1) | RESULT |
|---|---|---|---|---|---|
| 5.1 Glove length | See table 2 | Size XXL (11) | Length/mm L: 290, R: 294 | +0.3 mm | PASS |
| 5.1 Comfort and fit | See table 2 | Size XXL (11) Wearer hand size Left: L: 11, C: 8.5 Right: L: 11, C: 8.5 Comments on fit: Thumb slightly long | | N/A | PASS |
| 5.2 Dexterity | See table 2 | Size XXL (11) | Minimum pin diameter/mm 5.0 | N/A | Level 5 |

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed is:

1. An ambidextrous working glove made of polymer material comprising an external molded fish scale-textured pattern which provides grip to a first exterior side and a second exterior side opposite the first exterior side of the glove in at least part of the area of each of a palm, finger, and thumb regions; wherein
the reverse of the external molded fish scale-textured pattern in each of the areas is present on an inside surface of the glove and is configured to contact a wearer's hand when the glove is donned.

2. The glove of claim 1, further comprising an outer layer of first polymer material and an inner layer of second polymer material, the external pattern being on the outer layer and the reverse of the external pattern being on the inner layer.

3. The glove of claim 2, further comprising an antimicrobial coating on the outer layer of the glove.

4. The glove of claim 1, wherein the glove has a weight ranging from between about 10 grams to about 20 grams.

5. The glove of claim 1, further comprising one or more non-textured portions.

6. The glove of claim 5, wherein the one or more non-textured portions are located between each of four fingers of the glove and on a thumb region facing away from the four fingers.

7. The glove of claim 5, wherein a thickness of the glove in a textured area is between about 10% and 50% greater than a thickness of the glove in the one or more non-textured portions.

8. The glove of claim 1, wherein the external molded fish scale-textured pattern comprises a series of protruding ridges surrounding depressions.

9. The glove of claim 1, wherein the reverse of the external molded fish scale-textured pattern comprises a series of islands surrounded by channels.

10. An ambidextrous working glove comprising:
a fish scale-textured inner surface and a fish scale-textured outer surface, the fish scale-textured inner surface constituting the reverse of the fish scale-textured outer surface; wherein
the fish scale-textured inner surface and the fish scale-textured outer surface of the ambidextrous working glove are formed by a direct transfer function of a fish scale-textured surface of a former.

11. The glove of claim 10, further comprising a first polymer outer layer and a second polymer inner layer.

12. The glove of claim 10, further comprising a non-textured area, a thickness in the non-textured area ranging from 6 mil to 10 mil.

13. The glove of claim 10, wherein the fish scale-textured pattern outer surface is located on at least a palm of the glove, a back of the glove, four fingers of the glove, and a thumb portion of the glove.

14. A method for making an ambidextrous working glove having a fish scale-textured inner and outer surfaces comprising:
a. providing a first polymer solution;
b. providing a coagulant solution;
c. providing a second polymer solution;
d. providing at least one former and dipping the at least one former into the coagulant solution to coat the at least one former with coagulant;
e. removing the at least one former from the coagulant solution and drying the coagulant coating on the at least one former;
f. dipping the at least one former coated with the coagulant into the first polymer solution, and allowing the first polymer solution to coat the at least one former;
g. removing the at least one former from the first polymer solution and drying the polymer coating on the at least one former, forming a film;
h. washing the film on the at least one former, and dipping the film coated at least one former into the second polymer solution, and allowing the second polymer solution to coat the film; and
i. stripping the glove from the at least one former; wherein the at least one former has a fish scale-textured surface that imparts the fish scale-texture to the inner and outer surfaces of the ambidextrous working glove via a direct transfer function.

15. The method of claim 14, wherein the first polymer solution is a synthetic rubber copolymer solution.

16. The method of claim 15, wherein the synthetic rubber copolymer solution is a solution comprising a copolymer of acetonitrile and butadiene.

17. The method of claim 14, wherein the first polymer solution is latex.

18. The method of claim 14, wherein the second polymer solution is a polyurethane solution configured to allow the ambidextrous working glove to slide over a wearer's hand while the glove is being donned.

19. The method of claim 14, hereby the coagulant solution controls a thickness of the film of the first polymer solution.

20. The method of claim 14, wherein the film has a thickness selected from a range of from about 6 mil to about 10 mil.

21. An ambidextrous working glove, comprising:
- an outer surface having an external textured gripping pattern formed of depressions surrounded by protruding ridges molded on a first exterior side and a second exterior side, opposite the first exterior side, the pattern being present and providing grip on the first exterior side and the second exterior side of the outer surface forming each of palm, finger, and thumb regions; and
- an inner surface, located on a surface opposite to the outer surface, having the reverse of the external textured gripping pattern present on the first exterior side and the second exterior side of the outer surface forming an internal textured gripping pattern of islands surrounded by channels, the internal textured gripping pattern configured to contact a wearer's hand when the glove is donned, and the channels surrounding the islands being interconnected with channels surrounding adjacent islands, thereby allowing perspiration from a wearer's hand to flow away via the interconnected channels;

wherein the glove is formed of one or more polymers.

22. The glove of claim 21, wherein the protruding ridges surrounding the depressions are interconnected with protruding ridges surrounding adjacent depressions, wherein a first measured thickness of the ambidextrous working glove measured in a textured area between the first interior surface of the ambidextrous working glove and the first exterior surface of the working glove is greater than a second measured thickness of the ambidextrous working glove measured in a non-textured area between the first interior surface of the ambidextrous working glove and the first exterior surface of the working glove.

23. The glove of claim 21, wherein the channels surrounding the islands provide a contact-reducing texture to the inner surface.

24. The glove of claim 21, wherein the glove is powder-free, and is formed from a first solution comprising a copolymer and of a second solution that allows the glove to slide over a wearer's hand while the glove is being donned.

25. The glove of claim 21, wherein the glove is comprised of a plurality of layers.

26. The glove of claim 21, wherein the external textured gripping pattern present on the thumb region is positioned on the thumb region facing the finger region.

* * * * *